United States Patent
Packard

[15] 3,688,120
[45] Aug. 29, 1972

[54] DATA PROCESSING SYSTEM EMPLOYING QUENCH SIMULATION FOR ENABLING ACCURATE COMPUTATION OF SAMPLE ACTIVITY LEVELS IN LIQUID SCINTILLATION SPECTROMETRY

[72] Inventor: Lyle E. Packard, Hinsdale, Ill.

[73] Assignee: Packard Instrument Company, Inc., Downers Grove, Ill.

[22] Filed: April 14, 1967

[21] Appl. No.: 630,892

[52] U.S. Cl.........250/106 SC, 250/71.5 R, 250/83 C, 250/205, 250/207
[51] Int. Cl..............................................G01t 1/20
[58] Field of Search..250/106 SC, 71.5 R, 205, 83 C, 250/83 D, 207

[56] References Cited

UNITED STATES PATENTS

| | | | |
|---|---|---|---|
| 3,101,409 | 8/1963 | Fite | 250/71.5 |
| 3,123,724 | 3/1964 | Schrenk et al. | 250/205 |
| 3,188,468 | 6/1965 | Packard et al. | 250/71.5 |
| 3,381,130 | 4/1968 | Nather | 250/71.5 |

OTHER PUBLICATIONS

Baille, L. A., " Determination of Liquid Scintillation Counting Efficiency, by Pulse Weight Shift," International Journal of App. Radiation Isotopes, 1960, Vol. 8, pp. 1– 7.

*Primary Examiner*—James W. Lawrence
*Assistant Examiner*—Morton J. Frome
*Attorney*—Hubbard, Leydig, Voit & Osann Wolfe

[57] ABSTRACT

A data processing system for scintillation spectrometers of the type for measuring activity levels of samples containing radioactive isotopes and subjected to varying degrees of quench, including methods and apparatus for imposing a controlled simulated quench condition in each sample which, when added to the actual internal quench condition of the sample, creates an effective quench condition equal to a known predetermined actual quench condition for which counting efficiency is known with a high degree of accuracy. whereby true activity levels can be accurately computed in decay events per minute without incurring statistical errors inherent in interpolation and extrapolation techniques employed with conventional quench correlation data. Various methods and apparatus are described for creating a controlled simulated quench for each sample, together with an automatic computational system which permits direct display of activity levels in units of decay events per minute.

29 Claims, 19 Drawing Figures

PATENTED AUG 29 1972                    3,688,120
SHEET 01 OF 13
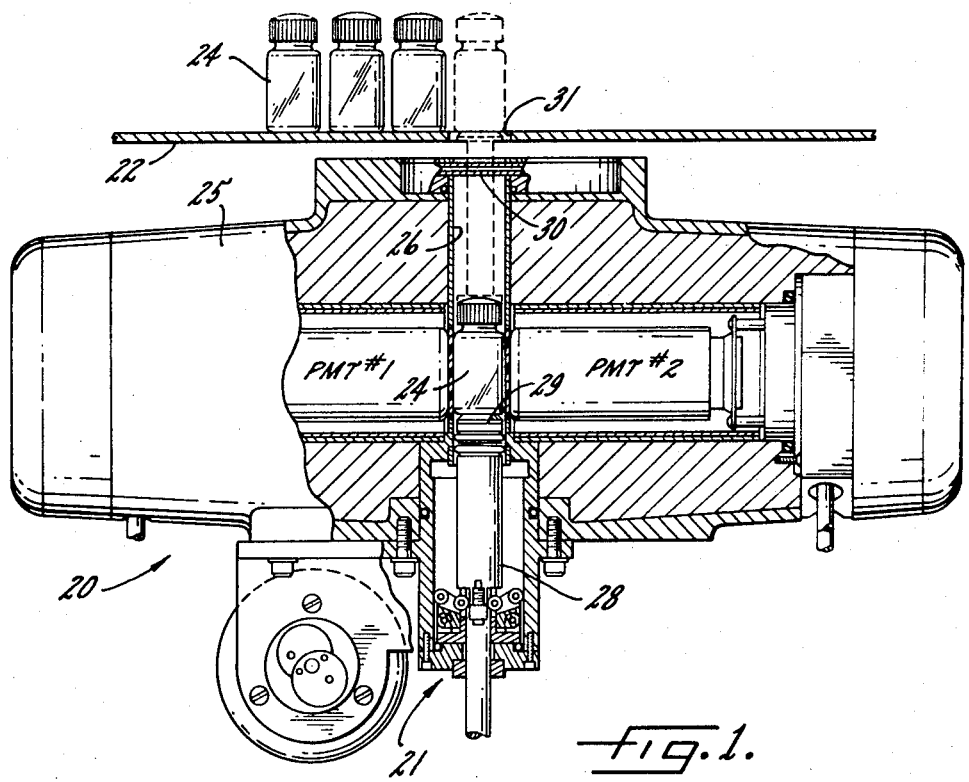
fig.1.
(PRIOR ART)
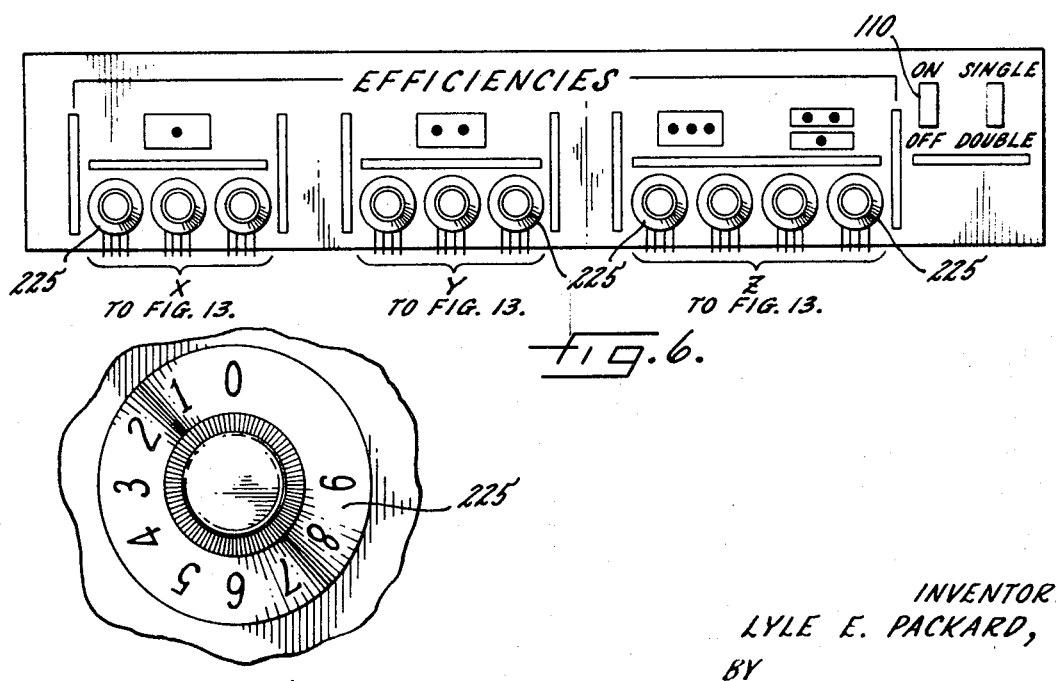
fig.6.
fig.6a.
INVENTOR.
LYLE E. PACKARD,
BY
Wolfe, Hubbard, Voit & Osann
ATTORNEYS.

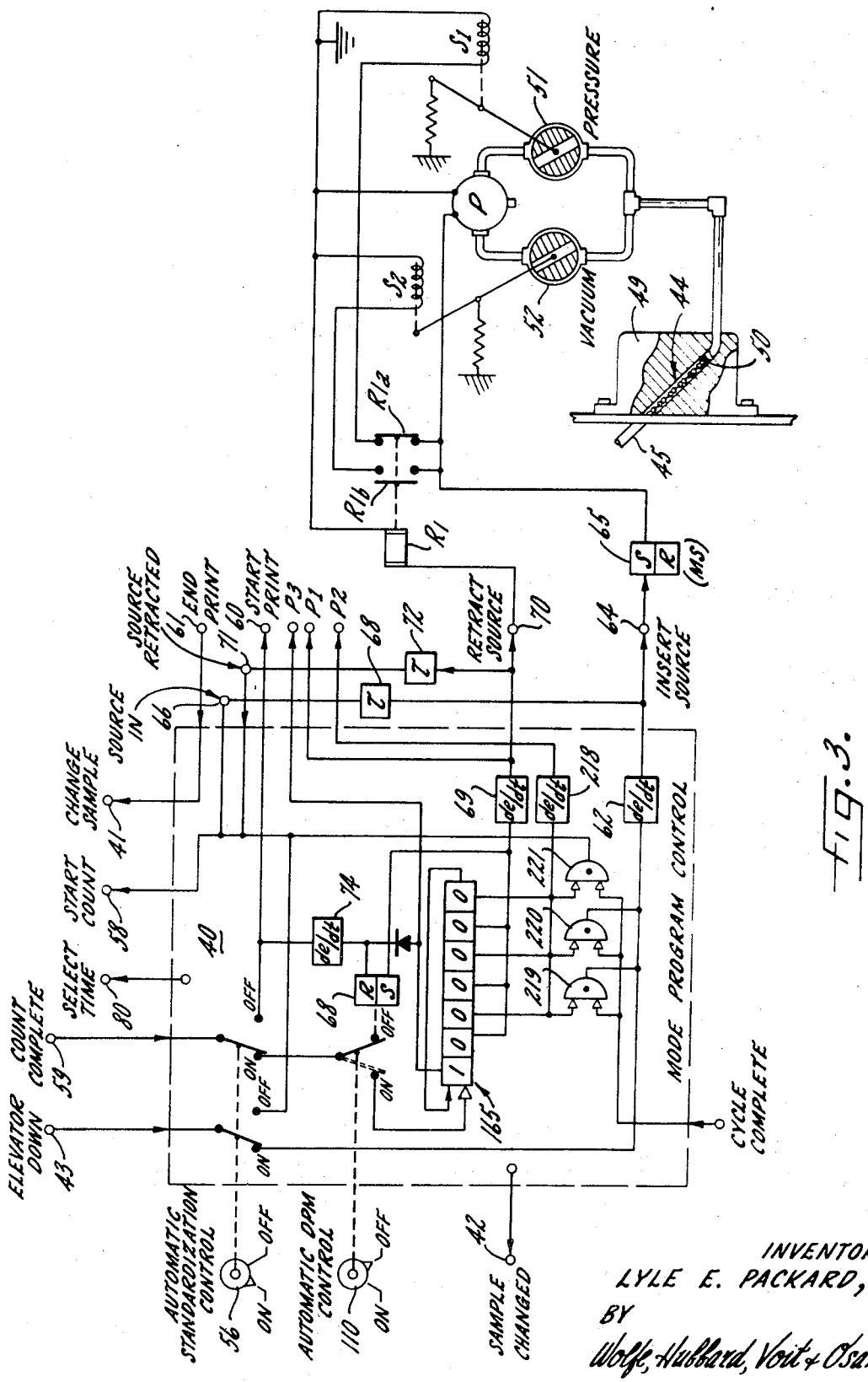

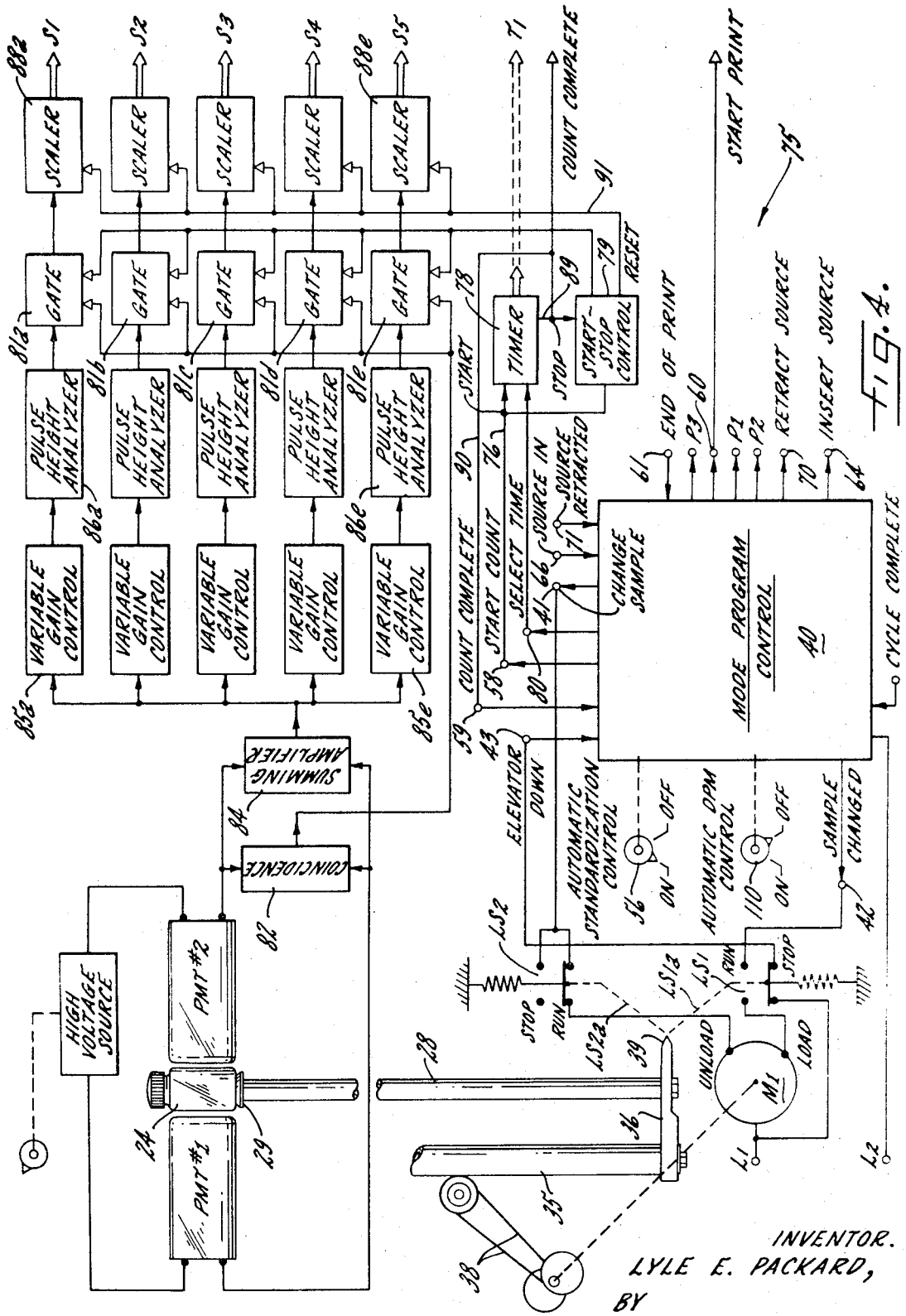

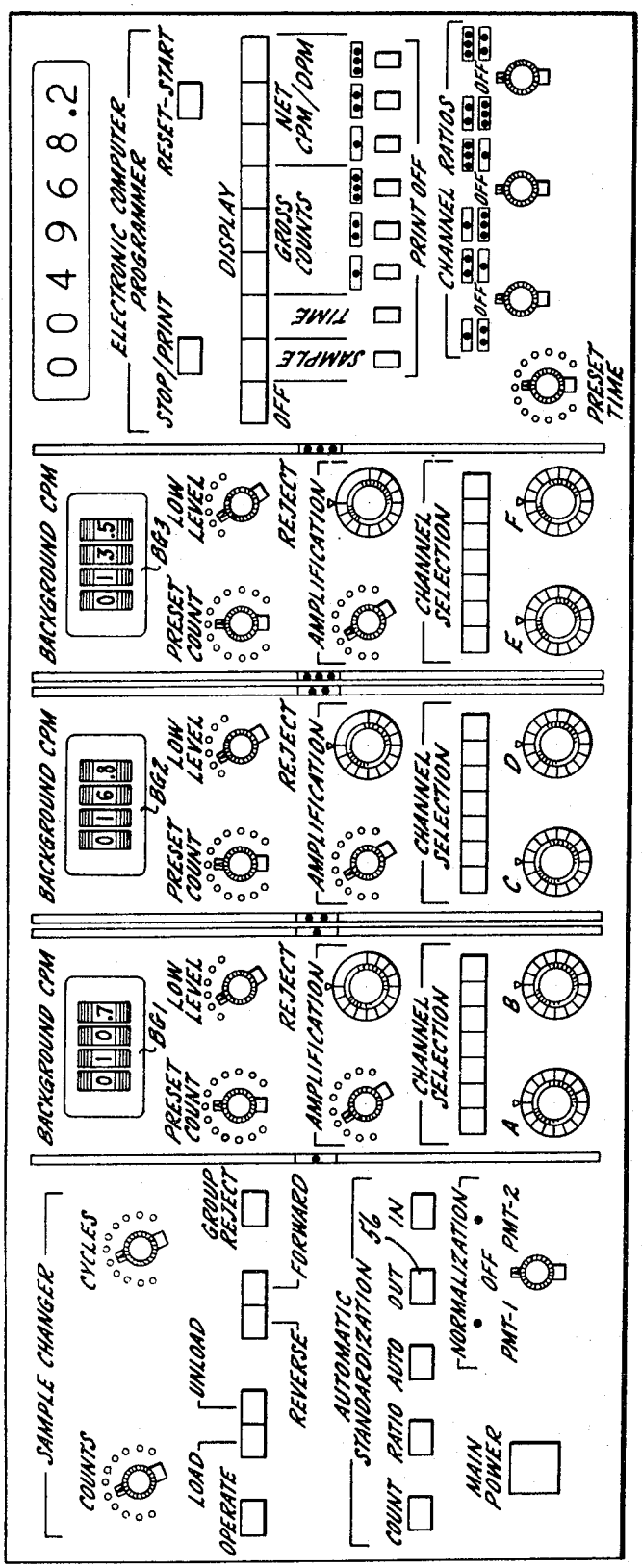

INVENTOR.
LYLE E. PACKARD,
BY
Wolfe, Hubbard, Voit & Osann
ATTORNEYS.

DATA PROCESSING SYSTEM EMPLOYING QUENCH SIMULATION FOR ENABLING ACCURATE COMPUTATION OF SAMPLE ACTIVITY LEVELS IN LIQUID SCINTILLATION SPECTROMETRY

CROSS REFERENCE TO RELATED APPLICATIONS

Robert E. Cavanaugh, Jr., Ser. No. 541,721, filed Apr. 11, 1966. Stanley M. Bristol, Ser. No. 629,462, filed Apr. 10, 1967. Robert E. Cavanaugh, Jr., Ser. No. 630,891 filed Apr. 14, 1967.

BACKGROUND OF THE INVENTION

The present invention relates in general to liquid scintillation spectral analysis of test samples containing unknown isotopes disposed in a liquid scintillator and, more particularly, to spectral analysis equipment and techniques which may be wholly automatic in operation, which virtually eliminate the effects of quenching as a source of error in determining true activity levels of test samples, and which readily permit direct display of such true activity levels, either visually or in printed form, in units of decay events per minute (dpm). In its principal aspects, the invention is concerned with an improved data processing system, as well as with improved methods and apparatus for simulating a controlled quench condition for all test samples, irrespective of whether the latter are actually unquenched or quenched and irrespective of the degree to which such samples may actually be quenched, whereby the effective quench condition of the sample (viz., the amount of actual quench internally of any given sample plus the simulated quench condition superimposed thereon externally of the sample) converges to a known selected value for which instrument counting efficiency is known with a high degree of accuracy.

Modern apparatus for detecting and measuring radioactivity has reached an unusually high state of development with systems currently available which offer unusual sensitivity to low energy radiation, as well as various options of full automation, semi-automation, or the more economical manual operating version. In a relatively few years, great strides have been made towards improving the preciseness and accuracy of counting efficiency in compliance with the very stringent requirements of users of this highly technical and sophisticated equipment. However, certain problems have continued to plague both the manufacturers and users of such equipment. A particularly prevalent and vexing problem has been the error introduced into computations of true sample activity levels because of a phenomenon commonly encountered with liquid scintillation samples known as "quenching." Stated very simply, this phenomenon results in attenuation of light scintillations within the samples, thus significantly affecting the statistical accuracy of the equipment which determines activity levels based upon the number and energy of such light scintillations, the latter being counted over known units of time and being proportional in energy to the energy of the decay events which produce them.

Many efforts have heretofore been made to minimize and, preferably, to eliminate, the errors which result from the quench phenomenon, some of which have completely failed and others of which have met with varying degrees of success and acceptance--however, notwithstanding all such efforts, the problem has remained as a source of error, which ofttimes amounts to significant error in the computation of true activity levels.

One principal effort that has heretofore been made towards minimizing the quench problem has been that of development of various constituents which make up the sample and which are as free of quench characteristics as possible. Such constituents include, without limitation thereto, scintillation substances, solvents, and the material from which the light transmissive sample vial is made. However, perfect light transmitters completely devoid of quench characteristics are simply not available, and even if they were, the problem would remain since the test specimen itself may, and often will, contain quench materials such, for example, as blood or urine, which tend to attenuate the light because of their color. Moreover, unless the detection system is maintained in a completely enclosed atmosphere of an inert gas such as argon, quench can occur simply because of the presence of air.

Faced with the seeming impossibility of eliminating the quench phenomenon as a source of error, numerous efforts have been made to cope with the problem by providing methods and apparatus for compensating for such errors. Typical systems which are currently employed and which have found great acceptance today by people employing this sophisticated equipment include systems in which an external standard source which emits highly penetrating radiations is placed adjacent the sample in the detection chamber during a portion only of its overall counting cycle. Light scintillations occurring in the sample are then counted during at least two discrete intervals, during one of which the scintillations are created only by the isotope in the sample and during the other of which the scintillations are created by the composite effect of the isotope and the external standard. Suitable electronic equipment is provided for separating the pulses from the two sources on the basis of their different energy levels and, therefore, those which are counted primarily from the external standard provide a fairly accurate indication of the degree of quenching present in the sample since the counting efficiency for such external standard is known or can be readily ascertained by use of an unquenched standard sample. Typical systems of this type are described in detail in Lyle E. Packard U.S. Pat. No. 3,188,468, issued June 8, 1965, as well as in the aforesaid Cavanaugh application Ser. No. 541,721, filed Apr. 11, 1966, both of which are assigned to the assignee of the present invention.

Both of the aforementioned prior systems are of the type which are commonly referred to as "external standardization" systems and both represent basic and significant improvements over earlier known systems described therein, such as "internal standardization" and "channels ratio" systems. In effect, however, all of these prior systems have had certain aspects which are common to one another, a principal one of which is that the measured quench correlation parameter (e.g., "net external standard count," "external standard ratio," "channels ratio," etc.) generally provides an indication of the degree of quench present in the sample, which indication must then be compared with a previously prepared quench correlation curve in order to determine the counting efficiency. Once knowing the counting efficiency, the counts per minute (cpm) measured for the isotope being analyzed can be divided by counting efficiency to determine activity level in decay events per minute (dpm). Unfortunately, however, the quench correlation curve itself differs widely from instrument to instrument, from isotope to isotope, from channel to channel, with sample volume, and with other variable conditions. Consequently, it has heretofore been necessary to prepare many of such curves, the preparation of each one of which has been time consuming, expensive, and subject to numerous human errors. Moreover, once the curves are prepared, it is necessary that the measured quench correlation data be compared with them in order to determine counting efficiency, thus introducing even further danger of human error.

Even more significant, however, has been the fact that while such a correlation curve can be prepared, it is only as accurate as the number of points which actually define the curve. It has been established that such points simply do not fall on the straight line, or even on a smoothly curved line—quite to the contrary, the points will be non-uniformly distributed in an unpredictable random pattern which only generally defines the correlation curve. Consequently, even when the technician uses extreme care in his computations, he has been forced to extrapolate or interpolate between known points and, since the extrapolated or interpolated data can vary significantly from the actual data, the computed efficiency can still vary greatly from actual efficiency with maximum errors on the order of up to 10 percent and average errors on the order of up to 2 percent being common, dependent upon the number of differently quenched standard samples selected to prepare the quench correlation curve.

Errors of the foregoing magnitude are simply not acceptable to the highly trained technical personnel who use this general type of equipment. Indeed, such errors are highly objectionable, and the more so in view of the high state of sophistication that the overall art has reached. However, these errors have heretofore been tolerated only because the prior systems briefly described above, and described in considerably greater detail in the aforesaid Packard U.S. Pat. No. 3,188,468 and Cavanaugh application Ser. No. U.S. Pat. No. 3,499,149, have represented the best available solutions to the problem up until the present date.

Continued efforts have, however, been made towards providing a more satisfactory solution to the problem. For example, it has been suggested that true activity level for a sample can be computed simply by dividing the measured variable quench correlation parameter (e.g., "external standard ratio," "net external standard count," "channels ratio," etc.) into the measured value in counts per minute (cpm) for the sample undergoing analysis. This suggestion, however, is not satisfactory for many reasons. First, it assumes that the quench correlation curve is a straight line, which it is not. Secondly, it fails to take into account the non-uniform random distribution of points which define such a curve. Therefore, even were the curve a straight line or substantially a straight line, errors of the same general magnitude as described above would still be experienced. The fact that the quench correlation curve is not a straight line actually adds to the magnitude of such errors with the result that errors on the order of up to 25 percent can be, and have been, experienced.

It has also been proposed that the problem can be resolved by adjusting in any of various known manners, overall system gain so as to restore the measurable quench correlation parameter to a value indicative of an unquenched sample, and thereafter, analyzing the sample as if it were unquenched. Again, however, such a proposed "solution" is no solution at all since the gain correlation curves do not coincide with nor follow the quench correlation curves and, consequently, the magnitude of error can be and often will be, even greater than that experienced with the interpolation/extrapolation techniques referred to above.

It is a general aim of the present invention to provide an improved data processing system which overcomes the foregoing disadvantages and which is characterized by its reliability and rapidity of operation. In this connection, it is an object of the invention to provide improved radioactivity spectrometry methods and apparatus which permit the determination of activity levels for test samples having any of a wide range of different quench characteristics with virtually unlimited accuracy, yet wherein this is accomplished by the utilization of quench correlation data based upon the measurement of only a relatively few, and indeed, in some instances, only one, known standards or standard. While not so limited in its application, the invention will find especially advantageous use when the measured variable parameter of such quench correlation data takes the form of net external standardization ratios, although it can also be used in connection with other measurable variable parameters which also provide an indication of the degree of quenching such, merely by way of example, as channels ratios, or net external standard counts.

As a consequence of attaining the foregoing general objective of the invention, it has been found that ancillary benefits achieved are that the danger of human error in both the preparation and reading of quench correlation data is greatly reduced; the versatility of such data is significantly increased; and the time and cost required to prepare such data are held to a minimum.

In another of its important aspects, it is an object of the invention to provide improved methods and apparatus suitable for use in radioactivity spectrometry applications which permit highly accurate determination of sample activity levels in terms of decay events per minute (dpm), and where such information can be printed or read directly without requiring the technician to perform close and tedious comparisons of detected or measured data with quench correlation curves.

It is a related object of the invention to provide improved spectrometry methods and apparatus which will greatly facilitate and speed up the quantitative determination of activity levels in terms of decay events per minute (dpm), yet wherein this is not only accomplished without sacrificing accuracy of the computations but, to the contrary, wherein the measurements are, on an average, considerably more accurate than has heretofore been feasible on a commercial basis.

It is one of the principal objectives of the present invention to provide novel spectrometry methods and apparatus for determining activity levels of test samples wherein provision is made for automatically compensating for errors attributable to quenching so as to permit direct display of activity levels in units of decay events per minute (dpm), either visual display or printed display, all irrespective of the amount of quenching that may be present in any given sample.

Another general aim of the present invention is the provision of novel and improved methods and apparatus suitable for use in computing true activity levels, corrected for quench errors, of test samples in units of decay events per minute (dpm) which are characterized by their accuracy and by their complete elimination of any need to visually or automatically interpolate or extrapolate between known points on a quench correlation curve, which interpolation or extrapolation has heretofore been essential and which has inherently introduced significant errors into activity level computations.

A further object of the invention is the provision of novel methods and apparatus for producing simulated quench conditions for each test sample undergoing examination so as to bring the effective quench level of the sample (the effective quench level consisting of the actual internal quench level of the sample plus the superimposed external simulated quench level) to a known and selectable level for which counting efficiency is accurately known, yet wherein this is accomplished without any noticeable loss in statistical counting accuracy.

It is a more specific object of the invention to provide novel methods and apparatus for statistically modulating signals representative of decay events in each test sample so as to simulate the presence of a quenching agent in the sample, and for adjusting the modulating signals so as to cause the effective quench level of the sample to converge upon a particular preselected quench level for which the counting efficiency is known with a high degree of accuracy. In this connection, it is an object of the invention to simulate quenching for all test samples, whether the latter are quenched or unquenched, and irrespective of the degree of quenching that may be present, so as to bring the particular variable quench correlation parameter being measured (e.g., external standard ratio; net external standard count; channels ratio; etc.) from its actual value for any given sample to a particular preselected simulated value where counting efficiency is known with a high degree of accuracy and which is at or somewhat below the value for such parameter for the most quenched sample that would normally be encountered by the technician.

It is a more detailed object of the invention to provide novel methods and apparatus for modulating the photon energy given off by the scintillating medium in the region between the scintillator and the photon-to-electron energy transducer, and thus to simulate a quench condition for the sample equivalent to that produced by the presence of an actual quenching agent in the sample itself, which simulated quench condition is automatically controlled so as to adjust the effective quench level for any given sample (irrespective of its actual quench level) to a preselected point where counting efficiency is known with a high degree of accuracy.

An ancillary object of the invention is the provision of novel methods and apparatus for establishing quench correlation data rapidly, economically, and with a high degree of accuracy, yet without requiring any advance preparation of standards having known and different quench conditions, and without requiring repetitive manipulation of such standards either manually or automatically, and wherein an unlimited number of simulated quench conditions can be produced using only a single unquenched standard.

Other objects and advantages of the invention will become apparent as the following description proceeds, taken in conjunction with the accompanying drawings, in which:

FIG. 1 is a fragmentary side elevational view, partly in section, depicting an exemplary radiation detection chamber and elevator mechanism suitable for processing samples in accordance with the present invention, the apparatus here being depicted with the elevator mechanism in the down or "sample loaded" position with the sample to be analyzed interposed between a pair of light transducers;

FIG. 3 is a fragmentary schematic wiring diagram of the control components utilized for positioning standard radioactive source material in a selectable one of two positions in accordance with the particular cycle of operation determined by the mode program control, the latter being depicted partially in block and partially in diagrammatic form;

Figure 2:
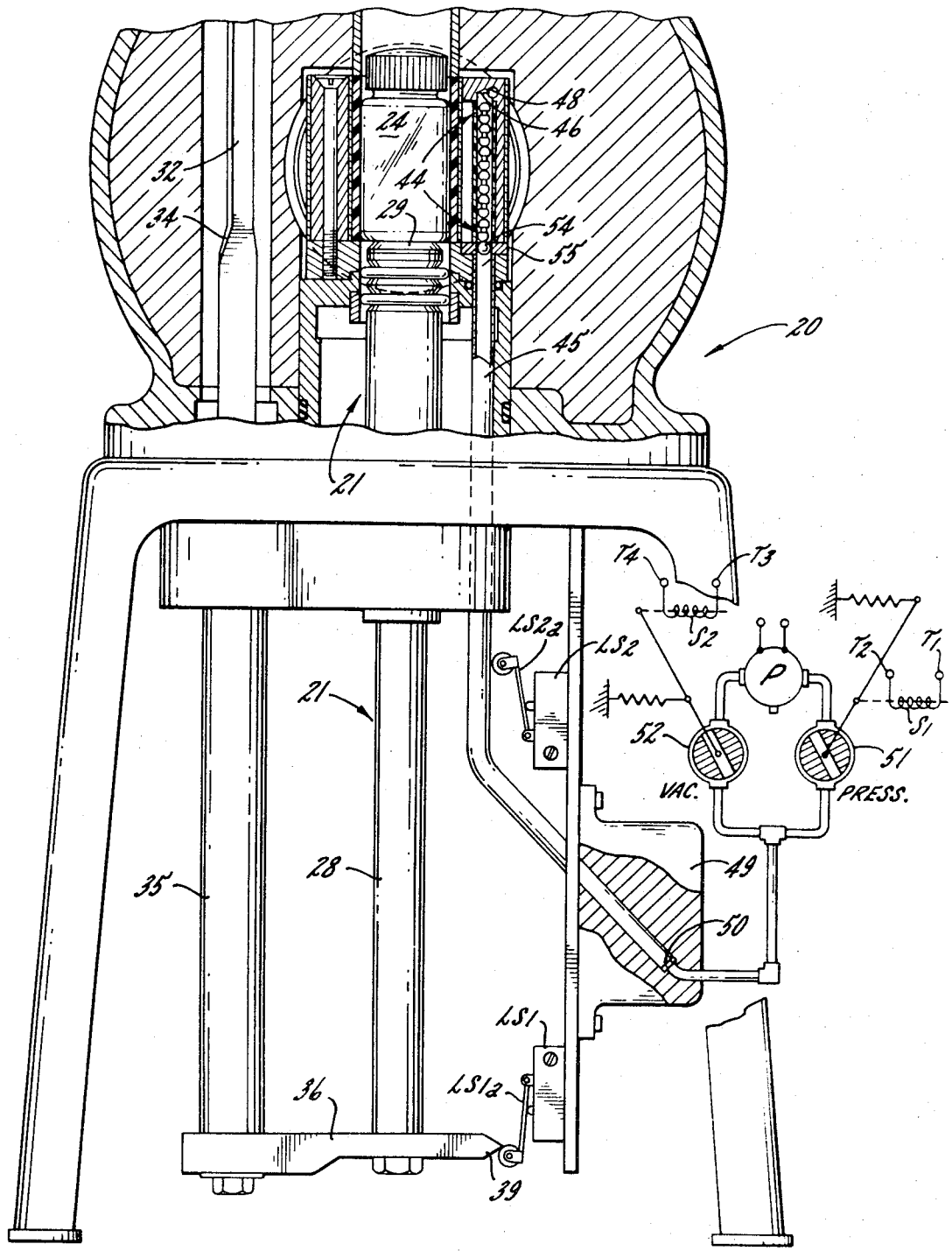
FIG. 2 is an enlarged fragmentary side elevational view, partly in section and partly in diagrammatic form, here showing a conventional apparatus for selectively positioning and recirculating external standard radioactive source material between a first position remote from and shielded from the detection chamber and a second position adjacent a sample disposed in the detection chamber.
Figure 7A:
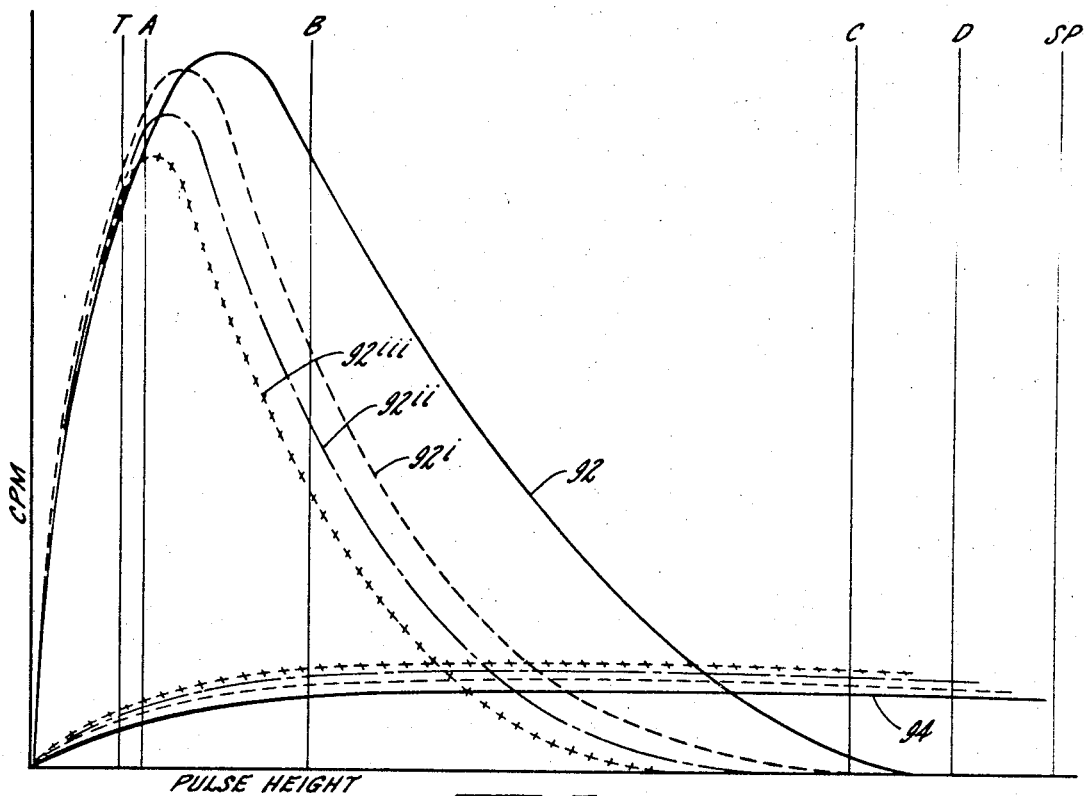
Figure 7B:
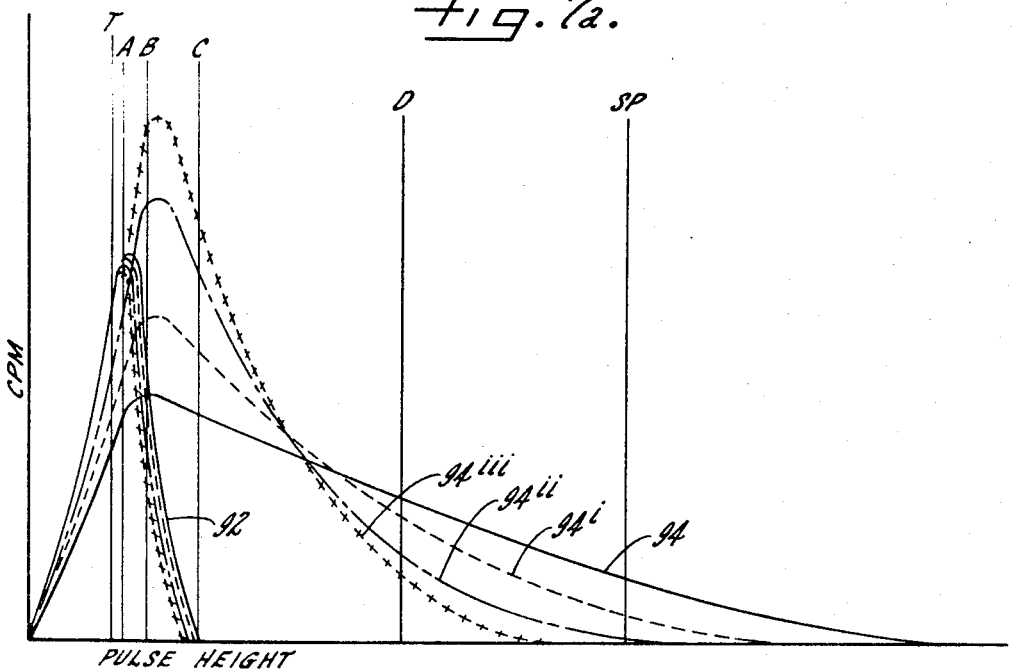
Figure 8:
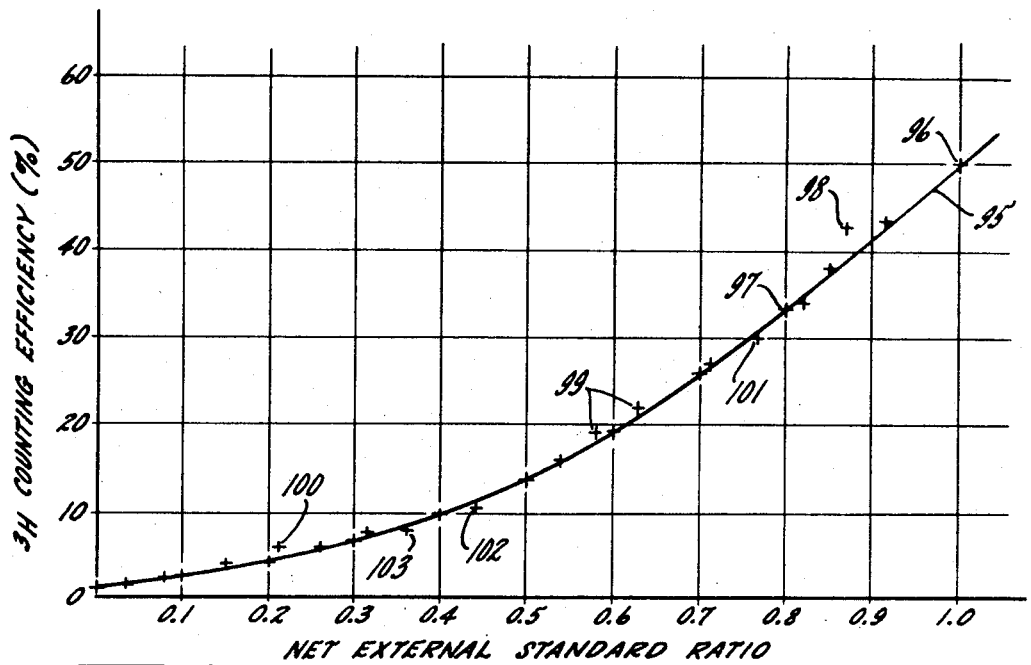
Figure 8A:
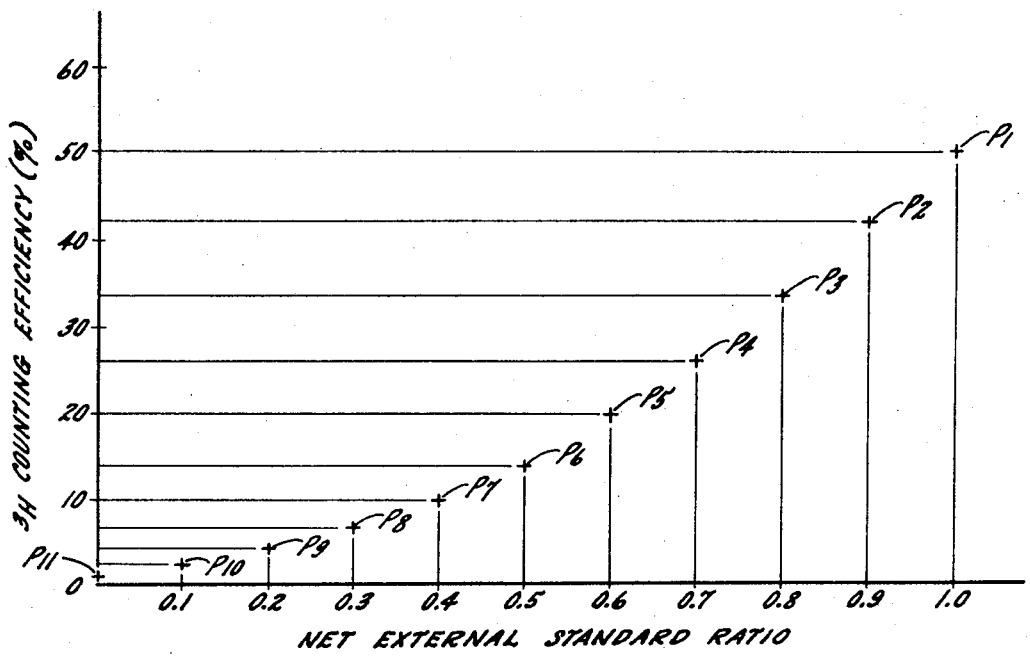
Figure 9:
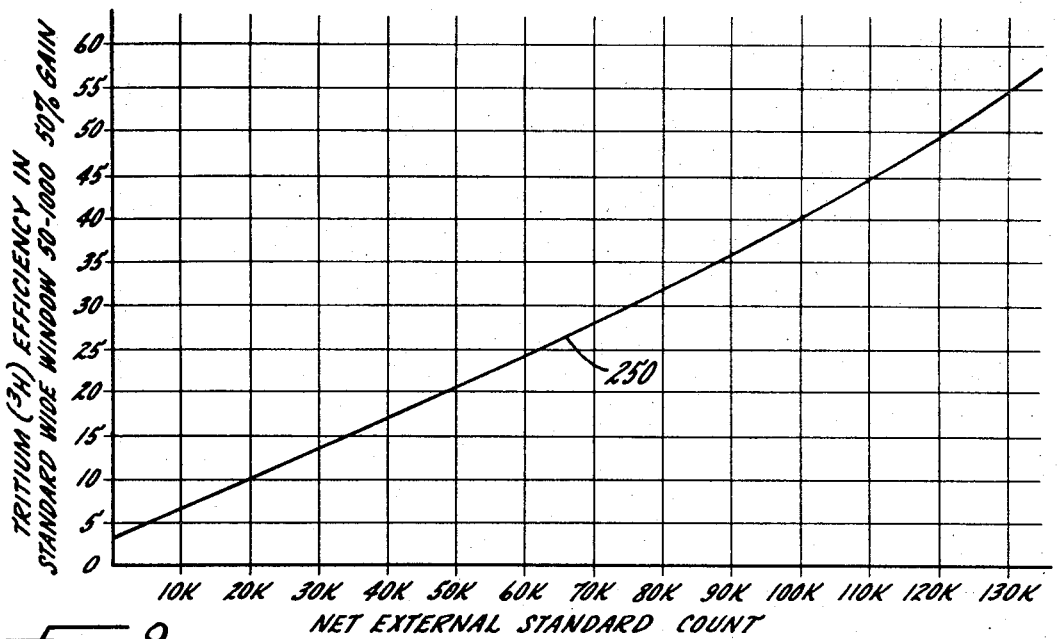
Figure 10:
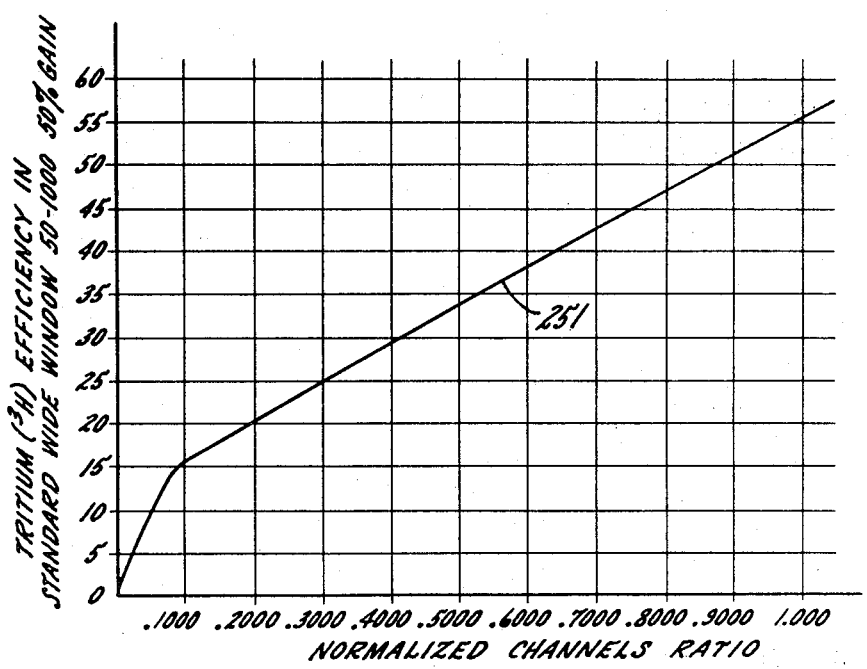
Figure 11:
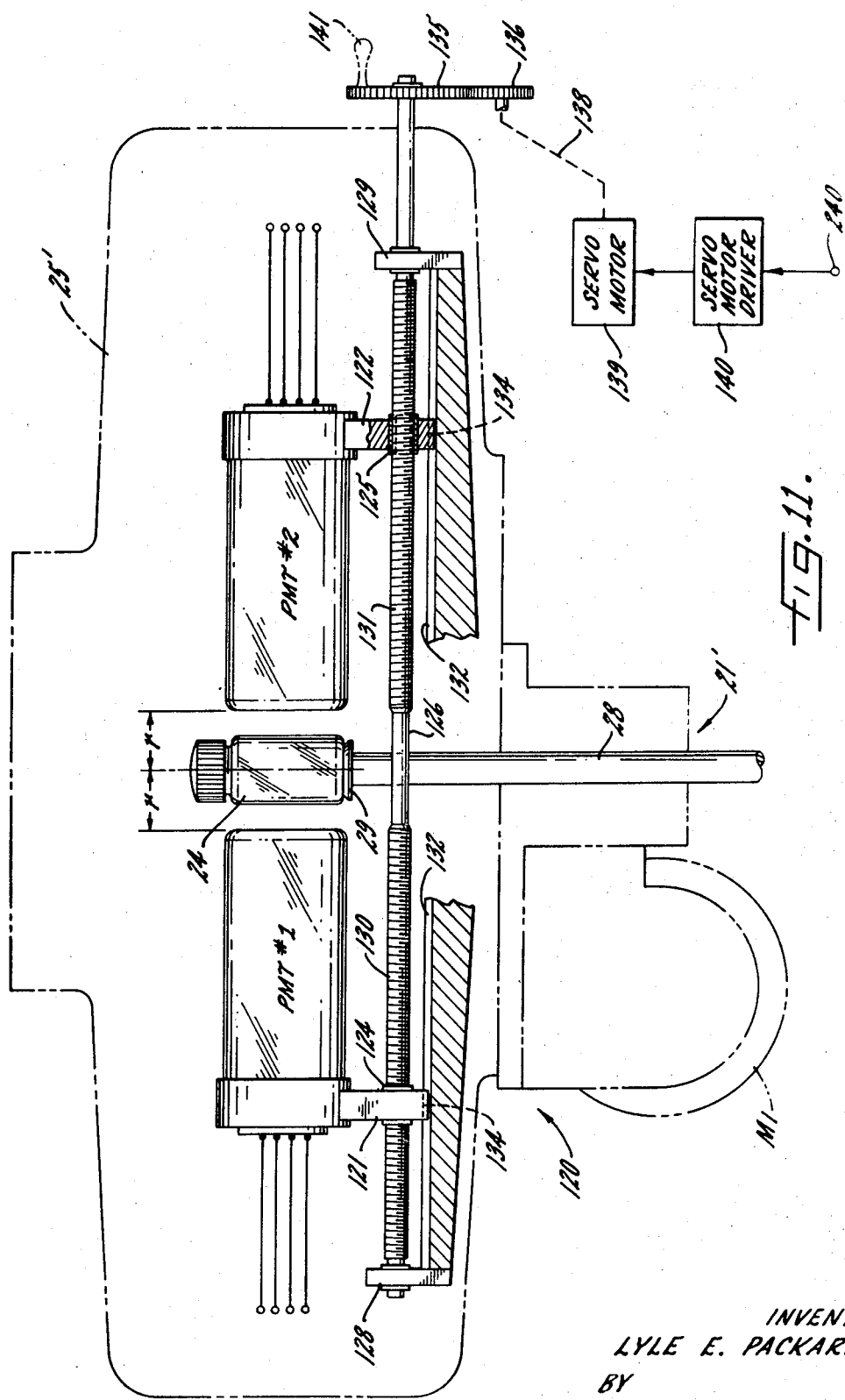
Figure 12:
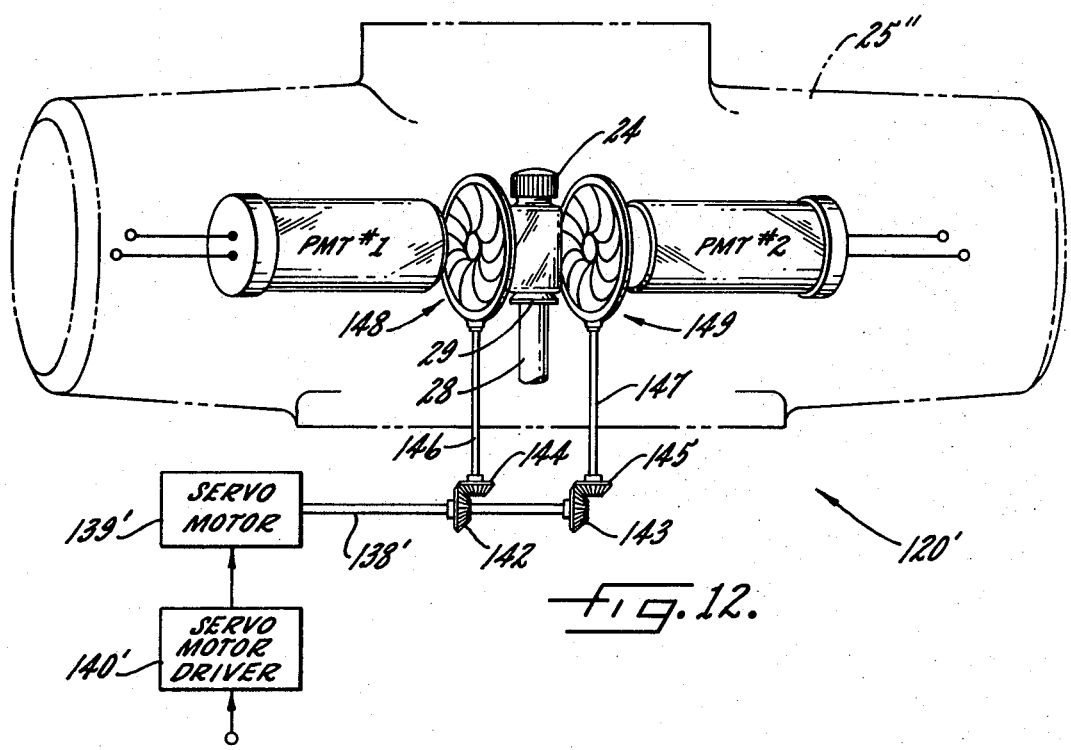
Figure 13:
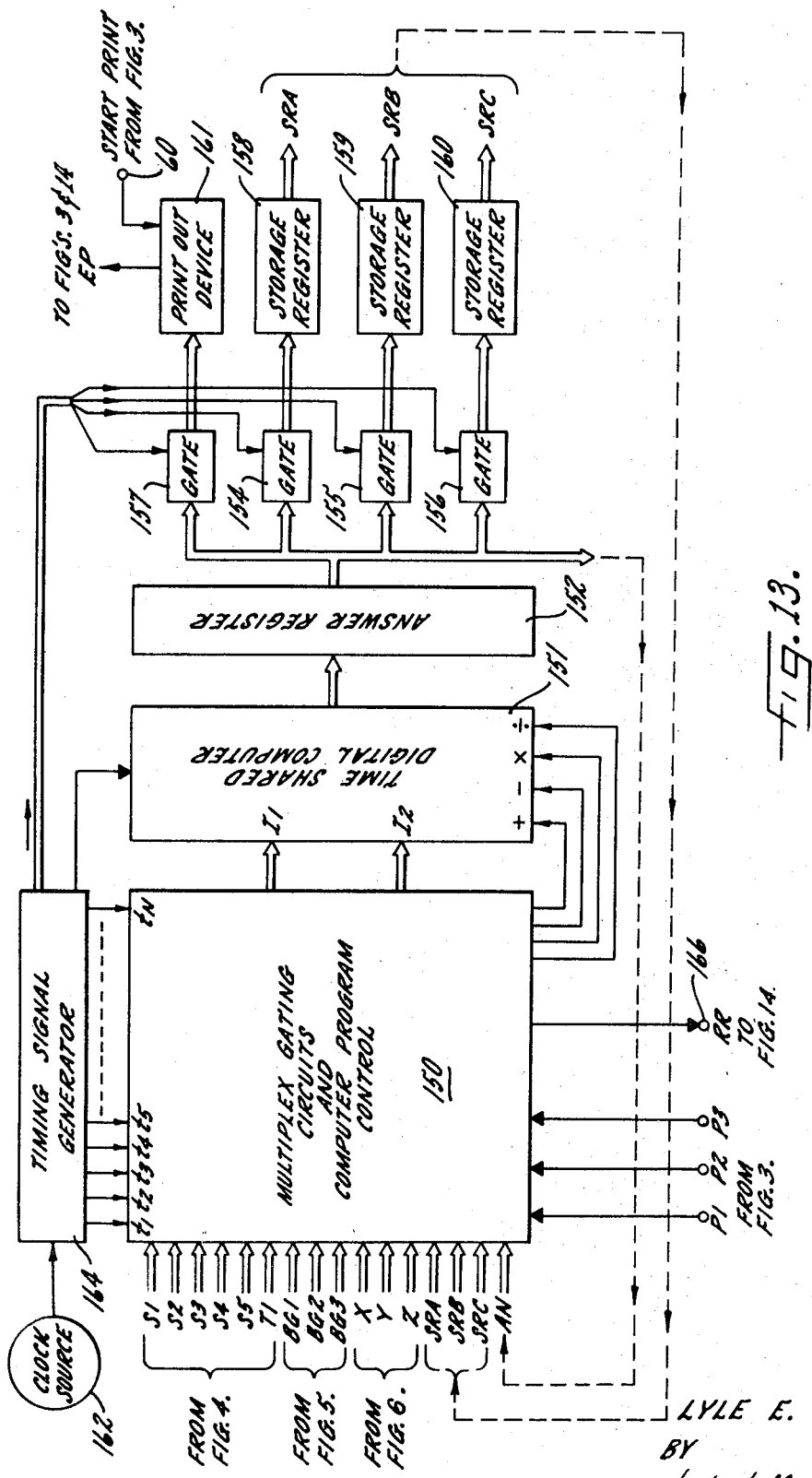
Figure 14:
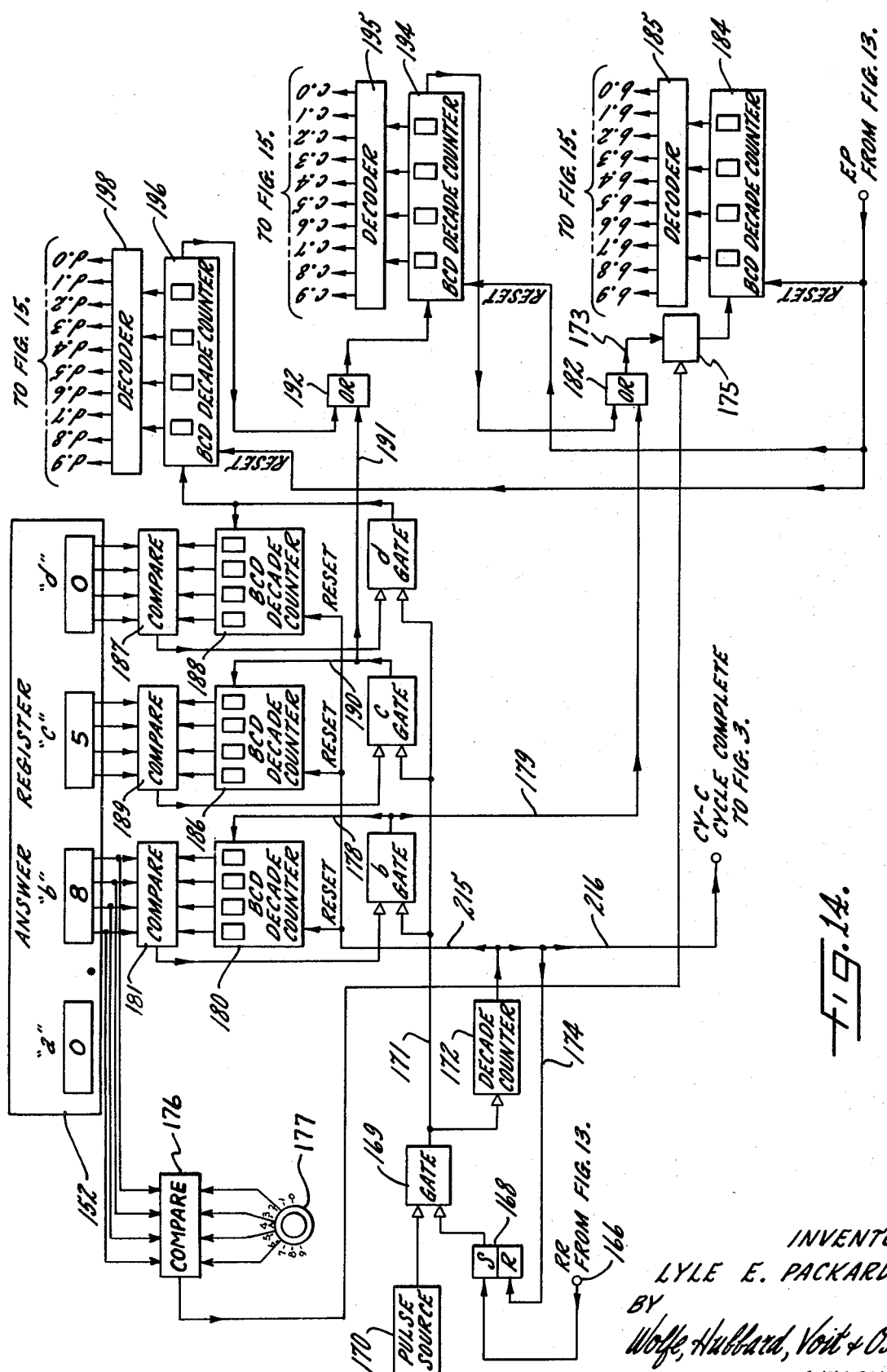
Figure 15:
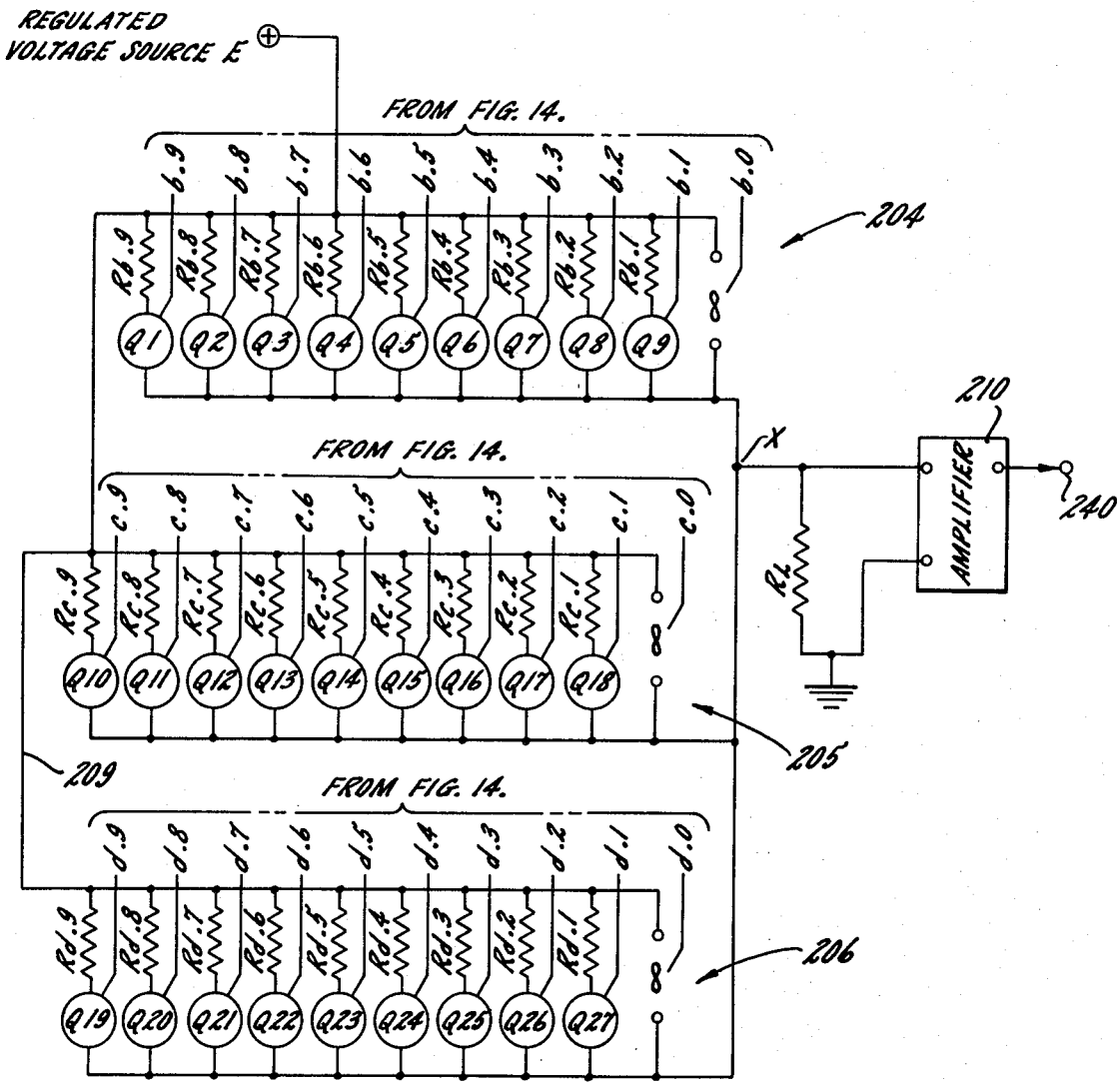
Figure 15A:
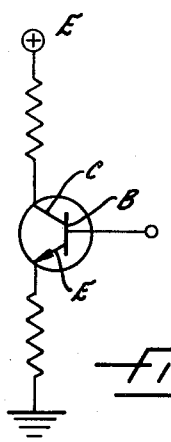

FIG. 4 is a schematic wiring diagram, partly in block form, here depicting an exemplary control system for operating the elevator mechanism shown in FIGS. 1 and 2 together with a conventional electrical system which accepts, counts and records the output of the radiation detector while at the same time providing certain control inputs in accordance with the present invention for the exemplary computer program control shown in FIG. 13;

FIG. 5 is an elevational view of a typical master control panel suitable for use with apparatus embodying the features of the present invention and capable of carrying out the methods of the present invention;

FIG. 6 is an elevational view, partly in diagrammatic form, of an exemplary auxiliary control panel by which the technician may selectively dial in predetermined efficiency values, or numerical representations thereof, for one or more isotopes in different pulse height analyzing channels so as to enable direct display of isotope activity level in units of decay events per minute (dpm) in accordance with the present invention;

FIG. 6a is an enlarged fragmentary elevational view of one of the BCD (binary coded decimal) decade dial switches shown in FIG. 6;

FIG. 7a is a graphic representation of typical pulse height spectra characteristic of two beta emitting isotopes of different energy levels and illustrating particularly the principle of "balance point" operation for the lower energy isotope as well as the effect of "quenching" on both the lower energy isotope and the higher energy isotope;

FIG. 7b is a graphic representation of typical pulse height spectra similar to FIG. 7a but here indicating the abscissa, which is scaled in units of pulse height, on an attenuated scale so as to shift the pulse height spectra downwardly and to the left with the higher energy isotope being illustrated in "balance point" within its pulse height analyzing channel;

FIG. 8 is a graphic representation of a typical smooth quench correlation curve (in which the abscissa is scaled in units of net external standard ratio as the measured variable quench correlation parameter indicative of quenching), which smooth curve is commonly used for determining the counting efficiency of a liquid scintillation counting system and which has heretofore led to significant statistical errors in computations of true activity levels for isotopes in test samples, here emphasizing particularly the non-uniform random distribution of actual measured points which define such a curve;

FIG. 8a is a graphic representation similar to FIG. 8 with the continuous smooth curve deleted and emphasizing particularly specific designated intercept points for which counting efficiency is known with a high degree of accuracy;

FIG. 9 is a graphic representation of a slightly different type of quench correlation curve which is somewhat similar to the curve shown in FIG. 8 but in which the abscissa is scaled in units of net external standard count as the measured variable quench correlation parameter indicative of the degree of quenching;

FIG. 10 is a graphic representation similar to FIGS. 8 and 9 but in which the abscissa is scaled in units of normalized channels ratio as the measured variable quench correlation parameter which is indicative of the degree of quenching;

FIG. 11 is an enlarged elevational view, partly in section and partly in diagrammatic and block form, somewhat similar to FIG. 1 but with the housing depicted in phantom and certain parts removed for purposes of clarity, here illustrating a radiation detection chamber made in accordance with one exemplary form of the invention and which is suitable for simulating controllable quench conditions for test samples disposed in the chamber;

FIG. 12 is a perspective view on a reduced scale, partially in diagrammatic and block form, depicting the same general organization of components as is shown in FIG. 11, but here illustrating particularly a slightly different type of detection chamber suitable for simulating quench conditions in test samples in accordance with a modified form of the invention;

FIG. 13 is a block diagram of an exemplary data processing system suitable for use in conjunction with the present invention, here illustrating particularly in block form a conventional time-shared digital computer together with the appropriate computer inputs and outputs;

FIG. 14 is a block diagram of exemplary control circuitry suitable for use in conjunction with the present invention for providing incremental changes in the quench simulation modulating signal so as to cause the effective quench level of the sample to converge upon a selectable predetermined quench level where counting efficiency is known with a high degree of accuracy;

FIG. 15 is a schematic wiring diagram of an exemplary arbitrary function digital-to-analog converter which is suitable for converting the output signals from the circuit of FIG. 14 to a useable control signal for modulating simulated quench conditions; and, FIG. 15a is schematic wiring diagram illustrating details of one of the illustrative transistor circuits shown in FIG. 15.

While the present invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

THE ENVIRONMENT OF THE INVENTION

Before discussing the present invention in detail, it may be helpful to first briefly consider the prior art background or environment within which the present invention finds especially advantageous application. In radioactivity measurements, it is the ultimate objective of most technicians to determine the activity level of isotopes which may be either singly present or present in multiple combinations within test samples, such activity level being expressed generally in units of decay events per unit time, e.g., decay events per minute (dpm). Thus, the quantity of a particular isotope present in a test sample is, in general, proportional to the rate of decay events produced by that isotope, such rate being termed the "activity level" of the source. As a generalization, the decay events or radiation emanations from a radioactive source are, for purposes of measurement or counting, converted into light scintillations which are generally proportional in photon energy to the energy of the decay event which caused them. The light scintillations are then generally converted into corresponding voltage or current pulses which are generally proportional to both the light scintillation and the decay event which caused the particular pulse. Such pulses are then discriminated on the basis of their amplitude, and then counted. The pulses may be counted for a predetermined time (termed "preset time" operation) or, alternatively, a predetermined number of pulses can be counted and the time required to reach such predetermined count measured (termed "preset count" operation). Generally, the ratio of counted pulses to the elapsed time period is indicative of the activity level of the sample.

a. General Organization and Operation Of An Exemplary Sample Processing Apparatus Referring now to FIGS. 1 and 2 conjointly, there has been illustrated an exemplary automatic sample processing apparatus, generally indicated at 20, which is intended to transfer a plurality of samples one at a time in seriatim order to and from a detection station. To this end, the exemplary apparatus 20 includes an elevator and detector mechanism, generally indicated at 21, which is positioned beneath a support table 22 (FIG. 1) on which one or more sample vials 24 are positioned both prior to and subsequent to transfer to a counting or detection station. As the ensuing description proceeds, those skilled in the art will appreciate that the particular means employed for conveying samples 24 to and from a point of alinement with the elevator mechanism 21 is immaterial to the present invention. Thus, it will be understood that the samples 24 may be carried in rotatable trays in the manner described in greater detail in both the aforesaid Packard U.S. Pat. No. 3,188,468 and Packard et al. U.S. Pat. No. 3,257,561, issued June 21, 1966 and assigned to the assignee of the present invention. Alternatively, a plurality of successive sample vials may be conveyed to a point of alinement with the elevator mechanism 21 by means of an endless conveyor having separate supports for the various vials. And, of course, it will be understood that successive sample vials may be manually placed on and removed from elevator apparatus 21. Moreover, while there has herein been illustrated and will be described a power driven elevator mechanism 21 for conveying successive samples 24 into and out of a detection chamber, the elevator need not be automatic and could take the form of a manually operated elevator of the type illustrated in one of the forms of the invention disclosed and claimed in Robert E. Olson U.S. Pat. No. 3,198,948, issued Aug. 3, 1965 and assigned to the assignee of the present invention. Indeed, the present invention will also find advantageous use in more rudimentary forms of radiation detection devices which are completely manual in operation and which do not employ any type of elevator, the samples being manually positioned within and removed from the detection chamber.

However, to facilitate an understanding of the present invention, the general organization and operation of the elevator and detector mechanism 21 will be briefly described hereinbelow. Those interested in a more complete operational and structural description of the mechanism 21 are referred to the aforesaid Packard and Olson patents.

Referring to FIG. 1, it will be noted that the elevator and detector mechanism 21 includes a base assembly 25 which houses a pair of light transducers, for example, photomultipliers PMT # 1 and PMT # 2 disposed on opposite sides of a vertical elevator shaft 26. Mounted within the elevator shaft 26 is an elevator 28 having a platform 29 at its upper end for supporting one of the radioactive test samples 24 and transporting the sample downwardly into the elevator shaft where it is alined between the photomultipliers PMT # 1 and PMT # 2. Each sample 24 may simply comprise a light transmissive vial or other suitable light transmissive container within which is placed a liquid scintillator and a radioactive isotope or isotopes to be measured. Thus, as the isotope or isotopes undergo decay events, light scintillations are produced in the light scintillator, and such scintillations are then detected by the photomultipliers which produce electrical output signals in the form of voltage or current pulses corresponding to each light scintillation detected. At the completion of the counting cycle the elevator 28 is returned upwardly so as to eject the sample 24 from the elevator and detector mechanism 21. A shutter mechanism 30 is mounted on the upper end of the base assembly 25 for the purpose of preventing erroneous output signals from the photomultipliers resulting from environmental light. At the same time, the base assembly 25 is formed of suitable shielding material such, for example, as lead, which serves to minimize the amount of environmental ionizing radiation causing light flashes in either the scintillation medium or the photomultipliers.

In order to insure that the shutter mechanism 30 is opened and closed in timed relationship with vertical movement of the elevator 28, the two devices are interconnected and actuated by a common reversible drive motor M1 (FIGS. 1 and 4). While not illustrated in detail, the shutter mechanism 30 comprises a plurality of movable shutter blades which are interleaved with a plurality of fixed shutter blades, the latter having apertures therein alined with the elevator shaft 26 and with an aperture 31 formed in the tablelike support 22. The arrangement is such that when the movable blades are pivoted about a pivot point (not shown), they swing between limit positions to selectively open and close the upper end of the elevator shaft 26.

To effect such pivotal blade movement, the movable shutter blades are rigidly secured to a stub shaft (not shown) in a manner more fully described in the aforesaid Olson patent. Suffice it to say that the stub shaft is rigidly secured to the upper end of a generally flat, depending shutter actuating shaft 32 (FIG. 2) having a twisted portion 34 intermediate its ends. The lower end of the actuating shaft 32 is received within a tubular drive shaft 35 (FIG. 2) the latter being coupled adjacent its lower end to the elevator 28 by means of a bracket 36. A pair of dowel pins (not shown) or similar cam means extend transversely through the tubular drive shaft 35 in closely spaced surrounding relation to the shutter actuating shaft 32.

The arrangement is such that as the drive shaft 35 starts to move vertically upward, force is transmitted through the bracket 36 and the elevator 28, thus driving the latter upwardly to unload the sample 24. Just prior to the time that the sample 24 reaches the shutter mechanism 30, the dowel pins or similar cam means traverse the twisted portion 34 of the shutter actuating shaft 32, rotating the latter about its own vertical axis and pivoting the movable blades of the shutter mechanism out of the path of vertical movement of the elevator 28. During a sample loading cycle, the dowel pins or similar cam means serve to cam the shutter actuating shaft 32 in the opposite direction immediately after the new sample 24 passes through the alined apertures in the shutter mechanism and the table, thus swinging the movable blades to the closed position shown in FIG. 1.

To effect vertical movement of the drive shaft 35 and the elevator 28 for the purpose of introducing samples 24 into and ejecting such samples out of the elevator shaft 26, the drive shaft 35 is drivingly coupled to a conventional reversible motor M1 (FIGS. 1 and 4). The particular means employed for coupling the motor to the drive shaft may vary and have not been illustrated or described in detail. Those interested in a more complete description are referred to the aforesaid Packard and Olson patents. It should suffice to state for the purpose of an understanding of the present invention that the motor M1 is coupled to the drive shaft 35 in the exemplary apparatus by means of cables diagrammatically indicated at 38 in FIG. 4. The arrangement is such that when the motor M1 is driven in one direction, the cables 38 are paid in and out so as to raise the elevator mechanism 21. Conversely, when the motor is driven in the opposite direction, the cables are paid in and out in the opposite direction, thus lowering the elevator mechanism 21.

The energizing circuit for the motor M1 includes a lower limit switch LS1 (FIGS. 2 and 4) which is mounted on the frame of the sample handling apparatus 20 in a position to have its actuator $LS1_a$ depressed by a laterally projecting flange 39 mounted on the lower end of the elevator when the latter is in a down position with the sample 24 carried thereon alined between the photomultipliers PMT # 1, PMT # 2. Depression of the actuator $LS1_a$ serves to deenergize the motor M1 and the apparatus is then ready for a counting cycle. A second limit switch LS2, included in a second energizing circuit for the motor M1, is mounted on the frame of the apparatus 20 in position to have its actuator $LS2_a$ depressed by the flange 39 when the elevator arrives at its uppermost limit position with the sample 24 carried thereon having been ejected from the elevator shaft 26. Thus, the limit switch LS2 serves to deenergize the motor M1 when the elevator reaches its uppermost limit position.

Referring now to FIGS. 1, 2 and 4 conjointly, a brief description of a typical "sample unload" and "sample load" cycle of operation will be set forth. Assuming that the exemplary elevator mechanism 28 is in its down position and that the sample vial 24 positioned in the detection chamber has undergone a complete counting operation for determining the activity level of the radioactive source therein, the technician is now ready to remove the particular sample 24 from the detection chamber between the photomultipliers PMT # 1, PMT # 2 and to substitute therefor a new sample 24. Considering for the moment, a semi-automatic operating cycle, it is merely necessary for the technician to press the "UNLOAD" button on the left hand portion of the master control panel (FIG. 5). When this is done, an energizing circuit will be completed from the terminal L2 of a suitable a-c source (not shown) through any suitable circuit (not shown) in the Mode Program Control 40, and from thence through the "Change Sample" terminal 41, the normally closed "RUN" contacts of the upper limit switch LS2, and through the "UNLOAD" terminal of the elevator motor M1, the latter being coupled to the terminal L1 of the a-c source. Under these conditions, the motor M1 will be energized and will start to rotate so as to raise the drive shaft 35 and the elevator 28. As the elevator 28 starts upwardly, the flange 39 which is integral with the bracket 36 will release the actuator $LS1_a$ of the lower limit switch LS1, thus permitting the latter to return to its normal condition with the "RUN" contacts closed and the "STOP" contacts open. As the elevator 28 approaches its upper limit position (the shutter mechanisms 30 having been opened by coaction of the shutter actuating shaft 32 and the drive shaft 35), the flange 39 engages the actuator $LS2_a$ of the upper limit switch LS2, thus shifting the latter to open its normally closed "RUN" contacts and close its normally open "STOP" contacts. When this occurs, the elevator motor M1 is deenergized and the sample vial 24 is in the "sample ejected" position.

During a semi-automatic operating cycle, the technician simply replaces the ejected sample vial with a new sample vial and then depresses the "LOAD" mode selector switch shown in the left hand portion of FIG. 5. On the other hand, in a completely automatic cycle of operation, closure of the "STOP" contacts of the upper limit switch LS2 could, through suitable circuitry not shown but described in greater detail in the aforesaid Packard et al. U.S. Pat. No. 3,257,561, cause energization of the indexing mechanism for automatically moving the next sample into place. In either case, when the new sample is in place an energizing circuit is completed from the terminal L2 of the a-c source through the Mode Program Control 40, its "Sample Changed" terminal 42, the normally closed "RUN" contacts of the lower limit switch LS1, and then through the "LOAD" terminal of the elevator motor back to the a-c terminal L1. The motor now runs in the opposite direction to again return the elevator 28 to its lowermost position. At the same time, the shutter mechanism 30 is closed as the drive shaft 35 moves downwardly and the cam means therein traverses the twisted portion 34 of the shutter actuating shaft 32. When the elevator 28 reaches its lowermost limit position, the cam actuator or flange 39 again engages and depresses the actuator $LS1_a$ of the lower limit switch LS1, thus breaking the "RUN" contacts and making the "STOP" contacts thereof. The motor M1 is again deenergized and the apparatus is now ready for another count cycle. Closure of the "STOP" contacts of the lower limit switch LS1 is effective to create a control signal from the terminal L1 of the a-c source to the "Elevator Down" terminal 43 of the Mode Program Control 40, thus signaling the latter that the apparatus is in condition for automatic initiation of the next counting cycle.

b. Automatic External Standardization

As stated above, the aforesaid Packard U.S. Pat. No. 3,188,468 discloses and claims various forms of procedures and apparatus for automatically subjecting successive samples to two separate counting cycles, during one of which the sample to be counted is exposed to a known quantity per unit time of radiant energy emanating from either an internal or an external standard. Generally stated, external standardization techniques are based upon a phenomenon known as "Compton Scatter," a phenomenon wherein the interactions that occur between penetrating radiation and electrons that comprise part of the test sample, produce electrons in the liquid scintillator having an energy spectrum similar in shape to that produced by a beta emitter. The "Compton Scatter" phenomenon is well known and need not be described in detail. Those interested in such a detailed description are referred to the aforesaid copending Cavanaugh application Ser. No. 541,721. Briefly, however, and with reference to FIG. 2, it will be observed that a standard source of penetrating radiation, here a compound source generally indicated at 44, has been illustrated at a position located exterior of and in proximity to the test sample 24 disposed in the detection chamber. As is characteristic of gamma emitters, or emitters of similar penetrating radiations, the source 44 will undergo a plurality of decay events in a given period of time, such decay events resulting in the emission of gamma rays in diverse directions. Certain of such gamma radiations will be directed towards, into or through the sample vial 24 disposed in the detection chamber, thus resulting in interactions between the gamma radiation and matter within the liquid sample, thereby causing excitation of electrons and producing a light flash therein. Under some circumstances, the energy of the gamma radiation may be totally absorbed, although more often the energy of the impinging gamma radiation is only partially absorbed. In the latter event, a photon will veer off randomly, in accordance with the principle of conservation of momentum, at a reduced energy until a second "Compton interaction" occurs. Since the photon is at a reduced energy, the chances of producing a second "Compton interaction" are increased. If and when the photon interacts with matter within the sample vial a second time, the energy of such photon will again be either totally or partially absorbed, thus producing electrons and creating a second light scintillation in the vial 24. The net result of the foregoing is that "Compton interactions" occurring in the sample 24 will produce an energy spectrum which is highly related by physical laws to that produced by a beta emitter. Consequently, if the isotope disposed in the sample 24 happens to have an energy spectrum that is highly related by physical laws to the energy spectrum produced by the "Compton interactions," then it is possible to determine the true activity level of the isotope regardless of the degree of quenching, changes in line voltage, or instrument drift, since the effect of these variables would be the same on both the isotope and the standard. This has conventionally been done by either arithmetical computations or by comparison with previously prepared sets of calibration curves.

As shown in FIG. 2, there has been illustrated an exemplary apparatus for pneumatically shifting the compound external standard radioactive source material 44 into and away from proximity to the sample vial 24 disposed in the detection chamber. Those interested in the specific details of this system are referred to the aforesaid Cavanaugh application Ser. No. 541,721. However, in order to facilitate an understanding of the present invention, this prior automatic standard positioning system will be briefly described below.

Referring to FIG. 2, it will be observed that the standard radioactive source material 44 is positioned within a generally vertically extending conduit 45 which terminates at its upper end adjacent the detection chamber within which the sample vial 24 is positioned. The upper end of the conduit 45 terminates in a fixed stop 46 and is coupled to atmospheric pressure through a suitable transverse conduit 48. The lower end of the conduit 45 projects into a shielded housing 49 which is rigidly secured to the frame of the apparatus 20, there being an annular stop 50 formed in the lower end of the conduit 45 within the housing 49. As here shown, the lower end of the conduit 45 is coupled directly to a pair of control valves 51, 52, the valves being respectively coupled to the pressure and vacuum sides of a conventional fluid pump which may simply take the form of a pneumatic pump P. In the illustrative apparatus, the pressure valve 51 is controlled by means of a solenoid S1 having terminals T1, T2, while the control valve 52 is actuated by means of a solenoid S3 having terminals T3, T4.

The arrangement is such that when the solenoid S1 is energized, the conduit 45 is coupled directly to the high pressure side of the pump P through the valve 51. Under these conditions, the compound standard source 44, which is confined within the conduit 45, is blown or urged upwardly within the conduit 45 until it engages the fixed stop 46 at the upper end of the conduit. Preferably, the solenoid S1 is only energized momentarily to provide a pulse of fluid pressure and, therefore, provision is made for magnetically holding the compound source material 44 in the position shown in FIG. 2 adjacent the sample vial 24. To this end, a steel ball 54 or other suitable magnetically attractable material is disposed within the conduit 45 immediately beneath the compound source 44. An annular torroidal magnet 55 is disposed near the upper end of the conduit 45 in surrounding relation thereto, the magnet being positioned generally at or near the upper edge of the elevator platform 29. Thus, when the solenoid S1 is deenergized, the source material 44 and the steel ball 54 will tend to fall downwardly through the conduit 45 until the steel ball is magnetically attracted by the magnet 55, thus precisely positioning the compound source material. When the technician wishes to remove the compound source material, it is merely necessary to momentarily energize the solenoid S2, thus coupling the conduit 45 directly to the vacuum or low pressure side of the pump P through the control valve 52. When this occurs, a vacuum is drawn in the conduit 45 and such vacuum, together with atmospheric pressure exerted through conduit 48 serves to drive the compound source material 44 and the steel ball 54 downwardly through the conduit until the train engages the annular fixed stop 50 within the shielded housing 49.

Turning now to FIG. 3, there will be described typical operating cycles for both the Automatic Standardization OFF and ON modes. Thus, assuming first that technician desires merely to count a particular sample without subjecting the sample to external radiation, it is merely necessary to condition the automatic standardization control switch 56 (FIGS. 3 and 5) in the OFF or OUT positions. Under these conditions, when the elevator 28 reaches the down position and a signal is imposed upon the "Elevator Down" terminal 43, such signal is effective through suitable circuitry in the Mode Program Control 40 to immediately create a control signal at the "Start Count" terminal 58, thereby initiating a counting cycle in a manner to be described in greater detail below. Upon completion of the counting cycle, a control signal will appear at the "Count Complete" terminal 59 for the Mode Program Control 40, which signal will be transmitted directly to the "Start Print" terminal 60 for the purpose of commencing a print cycle for the display portion of the apparatus. Upon completion of the print cycle, a control signal appears at the "End Print" terminal 61 which is transmitted directly to the "Change Sample" terminal 41 for purposes of energizing the elevator motor M1 through its "UNLOAD" terminal in the manner previously described so as to eject the test sample 24 from the detection chamber.

Assuming next that the technician wishes to count a sample in an Automatic Standardization operating mode, it is merely necessary that the control switch 56 be conditioned in the ON or standard IN condition. When this occurs, and the elevator 28 reaches its lowermost position with the new sample, the signal presented on the "Elevator Down" terminal 43 is conveyed through a differentiating device 62 to the "Insert Source" terminal 64 of the Mode Program Control. The signal pulse which is presented at the terminal 64 is applied directly to the "set" section S of a monostable flip flop 65 to cause the latter to switch from its "reset" to its "set" condition.

Since flip flops of the bistable and monostable variety are well known to those skilled in the art, they will not be described herein in detail. Rather, the flip flops have been illustrated symbolically as having a "set" section S and a "reset" section R with a junction therebetween. It will be understood that when a signal is presented at the junction of a bistable flip flop the latter will shift from one side to the other. Similarly, when an input signal or pulse is applied to the S section of a monostable flip flop, the latter will be momentarily "set," thus producing a predetermined output signal from the S section. After a time delay dependent upon the characteristics of the monostable flip flop, the latter will automatically return to its "reset" state.

Keeping the foregoing characteristics of conventional flip flops in mind, it will be observed upon reference to FIG. 3 that momentary switching of the flip flop 65 to the "set" state will complete an energizing circuit for the solenoid S1 through the normally closed contacts $R1_a$ controlled by a relay R1, thus energizing the control valve 51 and coupling the conduit 45 to the high pressure side of the pump P. At the same time, switching of the monostable flip flop 65 to the "set" state will also complete a momentary energizing circuit for the pump P, thus pressurizing the conduit 45 and shifting the compound source material 44 from the position shown in FIG. 3 to the position shown in FIG. 2.

At the same time that the control signal is applied to the "Insert Source" terminal 64, it is also conveyed to the "Source In" terminal 66 of the Mode Program Control 40 through a conventional time delay device 68 which provides a sufficient delay to insure that the compound source material has shifted from its shielded position in housing 49 to its effective position adjacent the sample 24. The control signal presented at the "Source In" terminal 66 is then conveyed directly to the "Start Count" terminal 58 to initiate a first counting cycle for the sample 24 while the external standard source material 44 is in proximate relation to the vial 24. Upon completion of the counting cycle, a signal is presented at the "Count Complete" terminal 59 of the Mode Program Control 40, which signal is passed through the "ON" contacts of the automatic standardization control switch 56 to the junction of a bistable flip flop 68 to cause the latter to switch from its "reset" to its "set" condition. When this occurs, a control signal is passed from the S section of the bistable flip flop 68 through a differentiating device 69 to the "Retract Source" terminal 70 of the Mode Program Control 40. The signal presented at the terminal 70 completes an energizing circuit for the relay R1 causing the normally closed contacts $R1_a$ controlled thereby to open and closing the normally open contacts $R1_b$ controlled by the relay. When this occurs, momentary energizing circuits are simultaneously completed through the now closed contacts $R1_b$ for the solenoid S2 and the pump P, thus energizing the latter and shifting the control valve 52 to a position where the conduit 45 is coupled directly to the vacuum side of the pump, thereby drawing the compound source material 44 from its position adjacent the sample vial 24 in the detection chamber back into its shielded position in the housing 49. At the same time that the control signal is presented on the "Retract Source" terminal 70, it is also conveyed to the "Source Retracted" terminal 71 of the Mode Program Control 40 through a conventional time delay 72 to insure that the compound source has been retracted. The signal presented at the "Source Retracted" terminal 71 is then conveyed directly to the "Start Count" terminal 58 of the Mode Program Control 40 to initiate a second counting cycle for the sample 24, this time with the external standard source removed. At the completion of the second counting cycle, a control signal is presented at the "Count Complete" terminal 59 and passed directly through the ON switch contacts for the automatic standardization control switch 56 to the junction of the bistable flip flop 68, this time causing the latter to switch from its "set" to its "reset" condition. Switching of the flip flop 68 to its "reset" condition establishes a control signal level which, after differentiation in a differentiating device 74 is applied as a control pulse at the "Start Print" terminal 60, thus again initiating a display cycle identical to that previously described, at the end of which a control signal is presented at the "Change Sample" terminal 41 which is effective to complete an energizing circuit for the elevator Motor M1 through its "UNLOAD" terminal, thereby ejecting the sample vial 24 from the detection chamber after it has undergone two successive counting cycles, one with the external standard source material 44 in proximity to the vial and one in which the external standard source material 44 is remote from the vial and within the shielded housing 49.

c. Programming Logic

Since procedures and equipment embodying the features of the present invention will normally be used with an associated programming control circuit, a typical programming system, generally indicated at 75 (FIG. 4), will be briefly described hereinbelow. To this end, it will be observed that after a sample 24 has been properly positioned between the detector photomultipliers PMT # 1, PMT # 2, a signal is presented on the "Start Count" terminal 58 in the manner previously described indicating that the new sample 24 is loaded and that the next counting cycle should be started. The control signal presented at the terminal 58 is then passed over a line 76 to the START terminals of a timer 78 and a start-stop control 79. At the same time, a control signal is passed from the Mode Program Control 40 through a "Select Time" terminal 80 directly to the timer 78, which signal serves to reset the timer to its zero time condition while at the same time selecting the increment of time for the timer 78 to operate during the ensuing counting cycle. The signal passed through the start-stop control 79 from the "Start Count" terminal 58 provides one of two control input signals which are necessary to open gates 81a, 81b, 81c, 81d and 81e, such as gates being respectively associated with five pulse height analyzing channels. During the predetermined time interval measured off by the timer 78, voltage or current pulses produced by the photomultipliers PMT # 1, PMT # 2, are simultaneously passed to a coincidence logic 82 and a summing amplifier 84. If pulses are simultaneously sensed from both photomultipliers by the coincidence logic 82, an output signal is passed from the coincidence logic 82 directly to the gates 81a–81e, thus providing the second control input signal necessary to open the gates. It should be noted at this point that the gates 81a–81e are of the type which are normally closed to prevent the passage of pulses therethrough and which are opened only by virtue of the simultaneous presence of control input signals from the coincidence network 82 and the start-stop control 79.

The pulses from the photomultipliers PMT #1, PMT # 2 which are passed to the summing amplifier 84 are algebraically added to provide a single output pulse representative of the sum of the two input pulses, which single output pulse is simultaneously presented to the input terminals of variable gain controls 85a-85e which are respectively associated with the five pulse height analyzing channels. The output signals from the variable gain controls 85a–85e are, in turn, respectively passed to the input terminals of five pulse height analyzers 86a–86e. Those skilled in the art will appreciate that the pulse height analyzers 86a–86e comprise suitable discriminator circuits (not shown) which may be selectively adjusted to permit passage of only a selected amplitude band of pulses therethrough. Moreover, the input pulses to the five pulse height analyzing channels may be differentially amplified by means of the variable gain controls 85a–85e in a manner described in greater detail in Lyle E. Packard U.S. Pat. No. 3,114,835, issued Dec. 17, 1963 and assigned to the assignee of the present invention. Thus, those pulses in each of the five pulse height analyzing channels which exceed in amplitude the base discriminator level for the respective analyzers 86a–86e but do not exceed the maximum discriminator level are passed from the pulse height analyzers to the input of the gates 81a–81e. Assuming that coincident signals have been detected by the coincidence network 82, such pulses are passed through the now open gates directly to the inputs of respective scalers 88a–88e or other suitable counting devices. In a completely automatic system of the type to be described herein, the scalers 88a–88e respectively provide output signals S1–S5 which are passed to the data processing portion of the system.

At the end of the timed period provided by the timer 78, the latter supplies a signal over lines 89 and 90 to respectively indicate to the Mode Program Control 40 that the count has been completed and to cause the start-stop control 79 to close the gates 81a–81e. Thus, referring to FIG. 4 it will be observed that the line 90 which is coupled to the timer is coupled directly to the "Count Complete" terminal 59 for the Mode Program Control 40. At this time, the timer 78 provides a timing signal T1 indicative of the length of the time period and a "Count Complete" signal which are also conveyed to the data processing system to be subsequently described in the same manner as the output signals S1–S5 from the scalers 88a–88e. Finally, at the time that the timer 78 times out and provides a "Stop" signal for the start-stop control 79, the latter, after a sufficient delay to insure that the data recorded in the scalers 88a–88 has been read out by the data processing portion of the system, provides a reset signal for the scalers over line 91, which signal is effective to reset all of the scalers to their zero state.

Because the system shown diagrammatically in FIG. 4 may take any of a variety of forms known to those skilled in the art, it need not be illustrated or described in greater detail. It will, however, be understood that the "counts" recorded by the scalers 88a–88e and provided to the data processing portion of the system as signals S1–S5 will include responses to background radiation which produces scintillation flashes in the liquid scintillator and which is received from extraneous sources, such background responses being in addition to the responses to radiation from the sample being measured. However, this "background count" can be first measured with no sample, or a sample of known radioactive strength in the detector. Such background count would, of course, include any negligible counts that are created by the external standard source 44 when the latter is in its shielded housing 49. The background count can then be subtracted from each sample reading to arrive at an indication of the sample's radioactive strength. To accomplish this, the apparatus is provided with three sets of four thumb-wheel type dial-in switches which are located on the master control panel (FIG. 5) and are designated as BG1, BG2, and BG3. Thus, after the technician has determined what the background count is for each of the three data channels — viz., the channels including scalers 88a, 88b and 88c — he need only dial such readings into the system and they will thereafter provide input signals BG1, BG2 and BG3 for the data processing portion of the system which can then be subtracted from gross counts to provide an indication of net counts per minute.

Besides counting the number of responses by the photomultipliers in a predetermined time interval (preset time operation), the time period required for the generation of a predetermined number of responses (preset count operation) may be measured and recorded, as is well known, in which event the Mode Program Control 40 would provide a suitable signal over the "Select Time" terminal 80 to cause the timer 78 to generate a "Stop" signal for the start-stop control 79 at the time that the preset count is reached.

d. Spectral Distributions and Factors Affecting Pulse Height Spectra

It is well known that beta emitting isotopes produce decay events which individually involve energies spread over a very wide range or spectrum. Each isotope has its own characteristic spectrum with a known maximum energy, such spectrum including a few decay events of near zero energy, a few decay events of maximum energy, and a majority of decay events having energies in the region between the upper and lower limits. Between these limits, the spectrum rises to a peak and then falls. Since the light transducers or photomultipliers PMT # 1, PMT # 2 produce pulses which are substantially proportional in amplitude to the energies of the corresponding decay events, the pulse height spectrum will, for a given gain of the photomultiplier, correspond to the energy spectrum of decay events. A characteristic pulse height spectrum for a typical low energy beta emitter such as tritium ($^3H$) is graphically represented by the spectral curve 92 shown in FIG. 7a. A similar characteristic pulse height spectrum for a typical higher energy beta emitter such as carbon-14 ($^{14}C$) is graphically represented by the spectral curve 94 shown in FIG. 7b. It will, of course, be understood that the area under the curves 92, 94 is representative of the total number of output pulses from the photomultipliers, and is, therefore, proportional to the total number of decay events occurring in the test sample in a given unit of time, say, one minute.

Considering, for the moment, the spectral curve 92 shown in FIG. 7a diagrammatically representative of the spectrum for tritium ($^3H$), it should be noted that such curve is here representative of the distribution of voltage or current pulse heights (either at the outputs of photomultiplier tubes or subsequently in the amplification circuits). Thus, for purposes of discussion the abscissa of the graph shown in FIG. 7a may be considered as volts as a measure of pulse height, while the ordinate is expressed in counts per unit time, or counts per minute (cpm). For an actual curve, the numerical values of pulse height would depend upon the gain settings of the photomultiplier and/or subsequent amplification stages (e.g., the amplifiers 84 and 85a–85e shown in FIG. 4), while the counts per minute scale would depend upon the activity level of the sample.

Let it be assumed for the moment that a sample containing a tritium isotope is to be analyzed and the technician wishes to record pulses representative of decay events occurring in the sample in the channel including pulse height analyzer 86a and scaler 88a (FIG. 4). In this event, the technician would adjust the two discriminators which define the pulse height analyzer 86a to establish a base level A and a maximum level B (shown diagrammatically in FIG. 7a) for the pulses that are to be counted. In other words, the technician would adjust the pulse height analyzer 86a so that any pulses which did not exceed level A in amplitude would be rejected, while any pulses which exceeded level B would also be rejected. Thus, the only pulses which would be counted would be those falling between the levels A and B and, thus, the AB discriminators define what is commonly referred to in the art as an "AB window." In order to operate the spectrometer at, or near, optimum counting conditions, it is necessary to adjust the pulse height analyzer 86a (FIG. 4) so that counting efficiency in the channel including scaler 88a (i.e., the ratio of counts observed on the scaler 88a to the number of decay events occurring in the test sample 24) is high while the number of background counts are low — preferably the AB window should be adjusted so that the ratio $E^2/B$ (where E is counting efficiency and B is background noise) is maximized. To achieve this desirable objective the AB window (FIG. 7a) of the pulse height analyzer 86a should be wide, but not so wide that the number of background pulses included in the window are great in comparison with the number of pulses resulting from decay events in the test sample.

Moreover, in order that the counting efficiency be as high as possible for a given window width, the AB window should embrace the peak portion of the pulse height spectrum 50, or as nearly so as possible. At the same time, however, it is essential that the level A be somewhat above the threshold level T for the electronic components of the equipment while the level B discriminator must be below the saturation point level SP for such equipment.

Considering FIG. 7b, it will be observed that the above discussion is also applicable to the setting of the equipment for the higher energy carbon-14 isotope ($^{14}C$) represented by the spectral curve 94. In this instance, however, since carbon-14 is considerably more energetic than is tritium, it is necessary to attenuate the pulse height scale in order to count with optimum efficiency. Thus, and assuming that the technician wishes to count the carbon isotope in the channel including pulse height analyzer 86b, the technician would first adjust the variable gain control 86b so as to shift the carbon spectrum downwardly to the solid line position shown by curve 94 in FIG. 7b. Comparing the curve 94 for carbon-14 in FIG. 7b with the curve 94 for carbon-14 in FIG. 7a, it will be noted that when the pulse height analyzer 86a is adjusted for optimum counting of the tritium isotope in the AB window, it is virtually impossible to establish good counting conditions for the carbon isotope. The reason for this is simply that in order to separate the two pulses the CD window defined by the discriminators which form pulse height analyzer 86b must be set close together and close to the saturation point of the equipment. Otherwise, there will be a significant contribution of counts in the CD window by the lower energy tritium isotope. However, by adjusting the variable gain control 85b, it is possible to produce conditions similar to that diagrammatically represented in FIG. 7b where satisfactory counting conditions can be established in the CD window for carbon-14 and wherein counts contributed by the lower energy tritium isotope are excluded.

A real problem often encountered in liquid scintillation spectrometry results from the phenomenon generally known as "quenching," a phenomenon which causes the pulse height spectrum representative of a given isotope to vary from that which would normally be observed when no quenching occurs. When the test sample 24 is prepared, a solvent for the scintillation medium is selected which is transparent and which has maximum light transmitting characteristics. The vial which contains the sample is also carefully selected to insure that it will not impede the transmission of light photons to the photomultiplier. However, the substance containing the radioactive material to be assayed often has relatively poor light-transmitting characteristics. Merely by way of example, if the radioactive isotope is contained within a blood or urine sample, the test sample will be red or yellow in color rather than clear. Such red or yellow coloring of the test sample impedes the transmission of light from the scintillation flashes to the photomultipliers PMT #1, PMT #2 so that the latter do not detect the same number of light photons as they would otherwise have detected had the test sample 24 been colorless. Stated another way, the light produced in the scintillation medium by a given decay event is attenuated in its passage to the photomultipliers with a consequent attenuation of the output pulses from the photomultipliers. Moreover, since certain of the lower energy decay events produce only a few light photons, the effect of light attenuation in the test sample will, in some instances, prevent a sufficient number of light photons from reaching the photosensitive cathode so that no detectable responses in the photomultipliers PMT # 1, PMT # 2 are produced. The foregoing phenomenon is commonly referred to as "color quenching" and can be represented graphically as shown in FIG. 7a by the spectral curves $92^i$, $92^{ii}$ and $92^{iii}$ which respectively represent progressively increased quench conditions for the unquenched tritium isotope represented by the curve 92. Thus, while the particular isotope being tested would, in the absence of quenching, produce a spectrum such as shown at 92, in the presence of such color quenching, the entire spectrum would shift downwardly (or to the left as shown at $92^i$ in FIG. 7a) because of light attenuation in the sample 24 and, as the degree of quenching is increased, the curve will progressively shift downward to positions represented by the curves $92^{ii}$ or $92^{iii}$.

There is still another source of quenching error which introduces problems into liquid scintillation spectrometry techniques. This latter source of error is commonly referred to as "chemical quenching," and results from the presence of certain substances in the test sample which, irrespective of color, interfere with the conversion of radiation energy into light energy. Such substances cause a portion of the radiation energy to be dissipated as heat rather than producing light photons in the scintillation medium. The presence of chemical quenching can in some instances involving relatively low energy decay events, prevent generation of a sufficient number of light photons to trigger the photomultiplier. It will be apparent, however, that chemical quenching will produce an effect similar to that produced by color quenching; i.e., the pulse height spectrum will be shifted to the left. And, of course, in certain instances, the total effect may be cumulative — that is, the test sample may be subject to both chemical and color quenching.

Referring to FIG. 7b, there have been diagrammatically illustrated spectral curves $94^i$, $94^{ii}$ and $94^{iii}$ which are respectively representative of progressively increased quench conditions for the higher energy isotope carbon-14. As here illustrated, it will be observed that the effect of quenching with the higher energy isotope is quite similar to that for the lower energy isotope — viz., quenching causes the curve to shift downwardly to the left because of the attenuation of light pulses.

A second factor important to optimum counting conditions is that of "balance point" operation, an operation wherein the spectrometer is adjusted so that it is relatively insensitive to slight shifts in the pulse height spectrum due to drift or changes in the system gain. Thus, referring to FIG. 7a, it will be observed that the effect of quenching which causes the spectral curve to shift from the position 92 to the position $92^i$ is that some pulses are lost from the AB window as the peak of the curve moves to the left. At the same time, however, some pulses are regained because of the shift. Assuming that the shift is slight, it will be observed that substantially the same number of pulses will be regained as are lost, and this is due to the fact that the peak of the curve is centered within the window. However, as the curve shifts more and more to the left (perhaps due to progressively greater quenching), more and more pulses will be lost and fewer will be regained. Indeed, it will be observed from FIG. 7a that by the time the curve has been quenched to the position shown at $92^{iii}$, the only change is a net loss of pulses and any additional quenching will not produce any recaptured pulses. However, operation of a spectrometer with the pulse height window adjusted to coincide approximately with the peak of the spectral curve is desirable since minor unavoidable drifts in system gain and minor quench effects, will cause the small loss of pulses from the spectrum shift to be balanced by a corresponding small gain of pulses. The balancing effect occurs whether the spectrum shifts slightly to the left or to the right, although it will be appreciated that shifts due to quenching will be downward shifts — that is, to the left, while shifts due to changes in gain can be in either direction. From the foregoing explanation it will be apparent that if the counting window (i.e., the AB window in FIG. 7a or the CD window in FIG. 7b) is not adjusted for balance point operation, shifts in the spectrum could result in appreciable erroneous changes in the counting efficiency and the measured count rate. Therefore, it is desirable to operate in balance point operation whenever possible. Referring to FIG. 7b, it will be appreciated that with the higher energy carbon isotope, the effect of quenching not only causes the curve to shift to the left, but it also causes the spectral curve to peak considerably higher while the peak itself does not move significantly to the left. In this instance, however, it has been found that the crossover between curves of varying degrees of quench occurs somewhat to the right of the peak of the curve. Consequently, balance point operation can be achieved by adjusting the CD window so that the approximate crossover point of the curves coincides with the midpoint of the window.

e. Quantitative Determination of Quenching and True Sample Activity Levels by External Standardization Techniques Those skilled in the art will appreciate that external standardization techniques are well known for their ability to provide a quantitative indication of the degree of quenching. Such techniques are described in detail in the aforesaid Packard U.S. Pat. No. 3,188,468 and the aforesaid Cavanaugh application Ser. No. 541,721 and Bristol application Ser. No. 629,462. Consequently, it should not be necessary to describe this system in detail. Suffice it to say that the output pulses from the summing amplifier 84 (FIG. 4) which are passed to the channels respectively containing the scalers $88d$ and $88e$ are adjusted in gain and discriminated so as to produce counts in the scalers $88d$ and $88e$ which are primarily representative of decay events occurring in the external standard source. For example, as thoroughly described in the aforesaid Bristol application, the pulse height analyzer $86d$ could have its base discriminator define the lower level of a G-to-infinity window (not shown) while the corresponding pulse height analyzer $86e$ could have its base level set to define an H-to-infinity window (not shown) where the level H is greater than the level G. In other words, in the G-to-infinity window all pulses which exceed in amplitude the G level would be counted in the scaler 88d, whereas only those pulses which exceed a higher amplitude level H would be counted in the scaler 88e. For practical purposes, it is preferable that the G-to-infinity and H-to-infinity windows be so adjusted that approximately two times as many counts will be recorded in the scaler 88d as in the scaler 88e when dealing with an external standard and an unquenched sample. Again, however, when quench occurs the spectral curve (not shown) for the external standard will shift downwardly and to the left in precisely the same manner as the spectral curves 92, 94 shown in FIGS. 7a and 7b. As a consequence of quenching, therefore, there will be fewer counts recorded in the G-to-infinity and H-to-infinity windows, thus changing the ratio of counts in the two windows. Since the ratio of counts received by each of the two infinity channels will no longer be the same, it provides a versatile procedure for quantitatively determining the amount of quenching.

Referring next to FIG. 8, there has been illustrated a conventional quench correlation curve for determining counting efficiencies for a typical beta emitting isotope. In this case, the quench correlation curve is for tritium ($^3H$) and the ordinate is, therefore, scaled in units of percentage of counting efficiency for tritium, while the abscissa is scaled in units of a measurable quench correlation parameter, in this case, net external standard ratio (viz., the ratio of counts recorded in the G-to-infinity and H-to-infinity windows).

In order to prepare a calibration curve such as is depicted in FIG. 8, the technician has heretofore normally prepared a series of samples of known activity for each different isotope that may be of interest. In the exemplary case, where the isotope of interest is tritium, the technician might, for example, prepare a series of 10 samples each of which includes the same amount of tritium activity (e.g., each of the ten samples might include 100,000 dpm of tritium activity). The technician will next add to each of the samples precisely the same amount of liquid scintillator medium, for example, 15.75 ml of liquid scintillator medium per sample vial. The technician then adds varying quantities of suitable quench material to different ones of the ten samples. For example, the first sample in the series of ten will usually be the unquenched sample and, consequently, no quench material is added to that sample. The second sample in the series will have a small amount of quench material added — perhaps on the order of approximately 15 microliters of quench material. The third sample will have a greater quantity of quench material such, for example, as approximately 30 microliters, while each succeeding sample in the series will have successively greater quantities of quench material inserted therein. The net result of this advance preparation is the formation of a series of 10 differently quenched samples each of which has approximately the same volume and each of which possesses the same activity.

Once the series of differently quenched samples has been prepared in the manner described above, the technician will then successively insert each sample in the series into the apparatus 20 (FIGS. 1 and 2) where the activity level of the sample is measured. Referring next to FIG. 4, let it be assumed that the apparatus there depicted has been adjusted so as to permit counting of the isotope undergoing test (here tritium) in the channel containing scaler 88a while the channels containing scalers 88d and 88e are preset so as to permit counting of an external standard (i.e., emissions emanating from the standard source material 44 shown in FIG. 2).

With the apparatus 20 and programming logic 75 (FIG. 4) adjusted in the foregoing manner, the technician may first insert the unquenched sample into the detection chamber of the apparatus and initiate a counting cycle for a predetermined time interval — say, one minute. During that one minute period, the standard source material 44 is shifted into proximity with the sample vial then disposed in the detection chamber, for example, by means of the apparatus shown in FIGS. 2 and 3 as previously described. During the course of this first 1-minute counting cycle, counts will be recorded in the scalers 88d and 88e which can readily be converted into a count ratio for the two channels, which ratio can be arbitrarily set at 1.0 for an unquenched sample. Thus, since the particular first sample being counted is the unquenched sample, the apparatus will display a ratio of 1.0. The standard source is then retracted in the manner previously described and the unquenched sample is subjected to a second counting cycle for a period of, say, one minute. During the second counting cycle, a certain number of counts will be recorded in the channel including scaler 88a which are, under the illustrative conditions, representative of counts emanating from the tritium isotope which, in this instance, has a known activity level of 100,000 dpm. Let it be assumed further that the scaler 88a reflects a recorded count of 50,000 counts during the one-minute counting period. The technician then knows that for that particular sample he has counted with an efficiency of 50 percent. Under these conditions, the technician is now able to plot the first point required to form the quench correlation curve generally depicted at 95 in FIG. 8, such point being represented at 96.

The foregoing procedure is then repeated for the second sample in the series which, in this instance, contains approximately 15 microliters of quench material. It will be found that since the second sample is quenched slightly, the counting efficiency recorded in the tritium counting channel will be somewhat less than the counting efficiency determined for the first unquenched sample, and in the illustrative instance, the second sample may show a counting efficiency of on the order of 34 percent. Similarly, during the automatic standardization portion of the counting period for the second sample when it is exposed to radiations emanating from external standard source material 44, it will be found that the ratio of counts recorded in the automatic standardization channels will drop slightly — for example, to approximately 0.80. Thus, the efficiency of 34 percent and the ratio of 0.80 determine a second point 97 on the calibration or correlation curve 95. The foregoing procedure is then repeated for each of the remaining eight samples that were prepared and the information recorded during the two counting periods for each of the samples is then entered onto the graph shown in FIG. 8. When all ten samples have been counted, the curve 95 may be drawn in.

While the quench correlation curve 95 shown in FIG. 8 has, for exemplary purposes, been shown as a smooth curve, as a practical matter the various points which define it do not fall precisely on the curve. Quite to the contrary, it has been found that the points which define the quench correlation curve 95 fall in an unpredictable random distribution with some points being on the curve as indicated at 96 and 97, some points being somewhat above the curve as indicated at 98, 99 and 100 by way of example, and other points being somewhat below the curve as indicated at 101, 102, 103 by way of example. Unfortunately, this random distribution of pulses can present serious problems and can lead to significant statistical errors in true activity level computations. This may be readily demonstrated by reference to the quench correlation curve 95 shown in FIG. 8 and the point 98 which is shown somewhat above that curve. Thus, let is be assumed that the technician prepared the curve 95 based upon the 10 samples which were described above and which did not include a standard sample having a quench level that produced an external standardization ratio of between 0.8 and 1.0. Under these conditions, the technician would have no way of knowing that the true efficiency for any given sample having a quench level between the points represented by the ratios 0.8 and 1.0 was not accurately represented by the smooth curve 95. Thus, if it is assumed that the technician inserted an unknown sample containing a tritium isotope into the apparatus 20 and first computed an external standardization ratio of 0.87 and then a count in the tritium counting channel of 40,000 counts per minute, it will be apparent that when he refers to the calibration curve 95, he will by extrapolation and interpolation calculate that a sample which produces an external standardization ratio of 0.87 should have a counting efficiency of approximately 39 percent, and therefore, an activity level of 102,564 dpm. However, as is made quite evident by the measure point 98, such a sample will not have a counting efficiency of 39 percent but, rather, it will have a significantly higher counting efficiency of on the order of 43 percent indicative of a true activity level, corrected for quenching, of 93,023 dpm. Hence even using the greatest of care with his calculations, the technician will arrive at a resultant activity level which is in error by 9,541 dpm or more than 10 percent.

TRUE QUENCH COMPENSATION BY SIMULATED QUENCHING ACCORDING TO THE PRESENT INVENTION

Thus far, the environment of the invention has been described in connection with apparatus and procedures for determining sample activity levels by comparison of detected variable quench correlation parameters (for example, net external standard ratios) with a previously prepared quench correlation curve which, unfortunately, is simply not accurate between the points which actually define the curve and which have previously been determined by actual measurements of differently quenched samples having the same known activity levels. As is well known, quenching is a phenomenon which affects counting statistics —that is, it either causes the photon energy to be attenuated to the point where it cannot produce a response at the photomultiplier cathode, or, alternatively, the number of photons is reduced sufficiently that fewer electrons are emitted from the photosensitive cathode of the photomultiplier. In both cases, counting statistics are altered. If one attempts to compensate for this error simply by adjusting system gain, the net effect is to either increase or decrease the amplitude of all the pulses caused by electron emission from the photosensitive cathode without in any way reducing the photon energy arriving at the light transducer; without affecting the number of electrons emitted at the photomultiplier cathode or collected at the first dynode; and, therefore, without affecting counting statistics.

In accordance with the present invention, provision is made for taking advantage of the fact that certain points which define the quench correlation curve are known precisely —viz., those points which are based upon prior measurement of differently quenched standard samples having the same known activity level — and, consequently, of the fact that counting efficiencies corresponding to any preselected one of such known points can be divided into the number of counts per minute (cpm) recorded for any particular isotope to ascertain true activity levels in decay events per minute (dpm). To this end, provision is made for creating a controlled condition by which counting statistics are affected and thus simulating a quench condition for each unknown sample sufficient to shift the detected data representative of each sample along the quench correlation curve until it coincides with a particular preselected one of the points for which counting efficiency is accurately known, which preselected point represents an effective quench level at or somewhat below the actual true quench level for the most quenched sample that the technician will normally encounter. Thereafter, all test samples, irrespective of their true internal quench level, will have superimposed on their true quench condition a simulated quench condition sufficient to lower counting statistics to a point corresponding to the preselected effective quench level.

For this purpose, and as best illustrated in FIG. 8a, let it be assumed that the technician has prepared a series of eleven standard samples each containing a known amount of tritium (e.g., 100,000 dpm). Let it further be assumed that the first of these samples is unquenched and, when subjected to two counting cycles as described above, produces a net external standard ratio of 1.0 and a measured counting efficiency of 50 percent. Under these conditions the first point P1 can be plotted on the graph shown in FIG. 8a. Let it next be assumed that the technician adds to the second sample of the series a sufficient amount of quenching agent to reduce the next external standard ratio to 0.9 during the first or automatic standardization portion of the counting cycle for that sample. If during the second portion of the counting cycle only 42,000 counts are recorded, the technician will know that for any sample having a net external standard ratio of 0.9, he will have a counting efficiency of 42 percent in that particular counting channel — thus, the second point P2 can be plotted. In like manner, the technician then proceeds to count each of the remaining nine standard samples, adding to each one progressively increasing amounts of quenching agent so as to reduce the net external standard ratio for each to 0.8, 0.7, 0.6 . . . 0.0 respectively, and then determines the counting efficiency for each sample at its particular known automatic standardization ratio. In this manner, the remaining points P3–P11 can be graphically plotted as shown in FIG. 8a. At the completion of this procedure, the technician will have a quench correlation curve represented by the actual known points P1–P11, which points may or may not, but probably will not, lie on a smooth continuous curve. Based upon the foregoing, the technician will know that for the particular isotope — here, tritium ($^3$H) — in the particular counting channel — for example, the AB channel including scaler 88a (FIG. 4) — the counting efficiency will be as set forth simply by way of example in Table I below.

relation parameter, for example, net external standard ratio, to shift towards a particular preselected one of the known points P1–P11 (FIG. 8a) while simultaneously changing counting statistics in a manner indistinguishable from that resulting from true quench within a sample. To this end, and in accordance with one exemplary form of the invention best illustrated in FIG. 11, there is provided a detection apparatus 120 generally similar in its arrangement of components to the elevator and detection mechanism 21 previously described in connection with FIG. 1. Thus, the detection apparatus 120 includes a base assembly 25' which houses a pair of photomultipliers PMT # 1, PMT # 2 disposed on opposite sides of an elevator shaft (not shown here for purposes of clarity). As in the FIG. 1 construction, the elevator and detection mechanism 21' includes a

TABLE I

| External standard ratio | 1.0 | 0.9 | 0.8 | 0.7 | 0.6 | 0.5 | 0.4 | 0.3 | 0.2 | 0.1 | 0.0 |
|---|---|---|---|---|---|---|---|---|---|---|---|
| $^3$H efficiency AB window | .500 | .426 | .338 | .274 | .199 | .148 | .102 | .078 | .049 | .023 | .007 |

It will be appreciated that the efficiencies set forth in Table I correspond to the number of counts contributed in the AB window of FIG. 7a by a tritium isotope under progressively increased quench conditions, such number of counts representing only a percentage of the total decay events of the tritium isotope.

Having completed the foregoing, the technician will now prepare a second correlation curve (not shown) for the carbon-14 isotope in precisely the same manner. However, in this instance the technician must take into account the fact that carbon-14 will not only produce counts in the CD window (i.e., the pulse height analyzing channel containing scaler 88b), but it will also produce some counts in the AB window as is made clearly evident upon inspection of FIG. 7a. Consequently, for each net external standard ratio from 1.0 through 0.0, the technician will be able to record two carbon-14 counting efficiencies — one of which is the carbon-14 efficiency in the CD window and the other of which will be the carbon-14 efficiency in the AB window. Based upon the foregoing, the technician will know that for the particular carbon-14 isotope, the counting efficiencies in the AB and CD windows will be as set forth below in Table II simply by way of example vertically reciprocable elevator 28 driven by an elevator motor M1 and having a platform 29 at its upper end for supporting a sample vial 24 intermediate the photosensitive cathodes of the photomultipliers PMT # 1, PMT # 2.

However, in keeping with one aspect of the present invention, the photomultipliers are not fixedly mounted within the base assembly 25' but, rather, they are mounted therein so as to permit controlled simultaneous movement of the two photomultipliers towards or away from the vertical center line passing through the detection chamber. In this way, it is possible to controllably vary the radial distance r from the center line to the photosensitive cathodes of the photomultipliers simultaneously and by the same controlled incremental change, thereby creating simulated quenching by reduction of the light input in terms of the number of photons which reach the cathodes from scintillations occurring within the sample vial 24 in accordance with the following equation: $N \cong 1(c)/r^2$     [1]
where $N$ is the number of photons and $c$ is a small number.

To accomplish this, the photomultipliers PMT # 1, PMT # 2 are respectively mounted on vertically de-

TABLE II

| External standard ratio | 1.0 | 0.9 | 0.8 | 0.7 | 0.6 | 0.5 | 0.4 | 0.3 | 0.2 | 0.1 | 0.0 |
|---|---|---|---|---|---|---|---|---|---|---|---|
| $^{14}$C efficiency AB window | .156 | .189 | .235 | .295 | .363 | .399 | .475 | .599 | .491 | .470 | .301 |
| $^{14}$C efficiency CD window | .799 | .765 | .741 | .669 | .586 | .492 | .388 | .251 | .169 | .077 | .021 |

In keeping with the present invention, provision is made for artificially simulating a controllable quench condition for each unknown sample, preferably by controllably modulating the quantum of light energy that reaches the photosensitive cathode of the photomultiplier, thereby altering the counting statistics so as to superimpose upon the actual quench characteristics of any given sample a simulated quench condition. In this manner, it is possible to cause the variable quench corpending brackets 121, 122, the latter respectively having coaxially aligned, nonrotatable, internal oppositely threaded bearing sleeves 124, 125 rigidly mounted therein. A horizontally disposed actuating shaft 126 passes through the alined bearing sleeves 121, 122 and is supported at its left hand end (as viewed in FIG. 11) in a bearing assembly 128 mounted on the base assembly 25', and near its right hand end in a similar bearing assembly 129 also rigid with the base assembly 25'. The left end of the shaft 126 is provided with a left hand threaded portion 130 threadably engaged with the bearing assembly 124 and bracket 121 supporting photomultiplier PMT # 1. The right hand portion of the shaft 126 is provided with a right hand threaded portion 131 which is threadably engaged with the bearing sleeve 125 and bracket 122 supporting the photomultiplier PMT # 2. The two brackets 121, 122, and hence the photomultiplier tubes, are maintained free for controlled movement towards and away from one another along a common axis while being prevented from rotating about the axis of the actuating shaft 126 by provision of a longitudinally extending track 132 fixedly mounted on the base assembly 25' and slidably engaged in complementally shaped grooves 134 formed in the brackets 121, 122.

For the purpose of rotating the actuating shaft 126 in controlled increments, and hence moving the photomultiplier tubes in controlled linear increments, the right hand end of the actuating shaft projects slightly beyond its bearing support 129 and is drivingly coupled to a gear train 135, 136 (here shown only in diagrammatic form, it being understood that the particular means employed for driving the shaft 126 could take any of well known conventional forms and could, if desired, be mounted within the base assembly 25'). As here shown, the gear 136 is coupled to the drive shaft 138 of a conventional reversible servo motor 139 which receives its input from a servo motor driver 140, the latter being provided with a control signal derived from terminal 240 (FIGS. 11 and 15). In keeping with the present invention and in a manner to be subsequently described, the control signal presented at terminal 240 is adjusted so as to permit the photomultipliers PMT # 1, PMT # 2 to move away from one another sufficiently far that the light energy reaching their cathodes is reduced by a factor required to simulate quenching to the preselected effective quench level. The apparatus shown in FIG. 11 might, if desired, be provided with a hand crank or the like, illustrated in phantom at 141, for purposes of manual operation and/or calibration, thereby enabling manual rotation of the actuating shaft 126 to vary the radial dimension $r$.

In carrying out the present invention, provision is made for subjecting each of n successive samples to repetitive counting cycles during the first several of which the sample is counted twice for a short time interval — say, for example, once for ten seconds with the external standard 44 adjacent the vial 24 and once for ten seconds with the external standard 44 remote from the vial. During each of these counting cycles the data measured is transmitted to the computational portion of the system (see FIG. 13) which automatically determines the net external standard ratio upon the completion of the exemplary 20-second counting cycle. That computed counting ratio is then compared with the particular preselected one of the eleven predetermined ratios for which counting efficiencies are accurately known (see FIG. 8a) and provision is then made for increasing the potential level at terminal 240 to simulate quenching so as to cause the computed net external standardization ratio to converge upon the lower preselected point. Thus, let it be assumed, merely by way of example, that the technician knows that for a particular group of samples the most quenched sample will produce a net external standard ratio (unaffected by simulated quenching) of at least 0.450. Under these assumed conditions he might elect to establish a preselected fixed external standardization ratio of 0.400 as the particular point to which he wishes to converge. In other words, all samples in that group, irrespective of their actual quench levels, will be subjected to simulated quenching in accordance with the invention so as to create an effective quench level for each sample of substantially 0.400. Assuming further that for any given sample 24 in that group the first computed ratio happens to be 0.850, then provision would be made for increasing the potential level at terminal 240 (FIGS. 11 and 13) so as to simulate quenching and cause the ratio to converge upon the preselected fixed ratio of 0.400, at which fixed ratio counting efficiency is accurately known (see, e.g., FIG. 8a). Once the potential level has been increased, the foregoing procedure is repeated and a new ratio is computed which, in this instance, may be 0.459. As a result of the second computed ratio, a small additional voltage increment is provided at the terminal 240, the foregoing steps are again repeated, and a new or third net external standard computed ratio is determined which may, for example, be 0.409. As the ensuing description proceeds, it will become apparent to those skilled in the art that more or fewer than the exemplary three counting cycles discussed above could be utilized to cause the simulated quench characteristics to converge upon the selected fixed ratio of 0.400. However, with the exemplary form of the invention it is believed that three such computations are generally sufficient to achieve close enough convergence that any error introduced into subsequent calculations is negligible. Thus, having converged to the proper fixed ratio, the apparatus is now conditioned for a data counting cycle during which the true activity level of the isotope or isotopes within the test sample may be accurately computed in units of decay events per minute (dpm).

Referring now to FIG. 13, there has been illustrated in diagrammatic and block form a typical computational system which may be utilized in carrying out the present invention. As there shown, the computational system includes Multiplex Gating Circuits and a Computer Program Control, designated generally at 150, into which are fed the signals from the scaler outputs S1-S5 (from FIG. 4) numerically representing the count held in each respective scaler, the signal TI numerically representative of the time period (from FIG. 4), the signals P1, P2 and P3 (from FIG. 3) indicative of the particular program or routine to be followed in ensuing computations, and the signals BG1-BG3 numerically representing the background count for the data counting channels dialed in on switches BG1-BG3 (FIG. 5). The output from the Multiplex Gating Circuits and Computer Program Control 150 is fed directly to a time-shared digital computer 151 together with suitable command instructions for effecting addition, subtraction, multiplication or division operations. The computer output is in turn fed directly to an Answer Register 152 which provides an answer signal AN, the latter being fed back into the Multiplex Gating Circuits and Computer Program Control 150 as well as to the input of four normally closed gates 154, 155, 156 and 157. As here shown, the output from gate 154 is transmitted directly to a storage register 158 which provides, upon demand, an input signal SRA for the Computer Program Control 150. Similarly, the gates 155 and 156 respectively provide input signals for storage registers 159 and 160 which, upon demand, respectively provide control input signals SRB and SRC for the Computer Program Control 150. The gate 157 provides an input signal to a conventional printing device 161 which, upon completion of a printing cycle, provides an "end of print" signal EP which is conveyed to the terminal 61 shown in FIG. 3. Finally, the computational system illustrated diagrammatically in FIG. 13 is provided with a clock source 162 of any conventional type which provides clock pulses to a timing signal generator 164, the latter being capable of initiating time signals $t_1$ through $t_n$ for initiating operation of the various programmed cycles and opening the various gates 154–157 at prescribed time intervals.

In order to facilitate an understanding of the present invention, there will hereinbelow be described an exemplary counting cycle for a typical unknown sample which is known to contain two different isotopes —say, for example, tritium ($^3H$) and carbon-14 ($^{14}C$). Thus, the particular sample 24 will be placed upon the elevator platform 29 by the technician, either manually or automatically, and the elevator 28 will start its downward movement, all as previously described in detail. When the elevator 28 reaches its lowermost position, closure of the "STOP" contacts of the lower limit switch LS1 will serve to impress a control signal upon the "Elevator Down" terminal 43 (FIGS. 2 and 3) which signal is then transmitted through the "ON" contacts of the automatic standardization control mode selector switch 56 and through the differentiating device 62 (FIG. 3) to the "Insert Source" terminal 64, thereby causing the compound source material 44 to shift from its shielded housing 49 into a position adjacent the sample vial. As previously stated, after a sufficient time delay determined by the device 68, a "Source In" signal is impressed upon terminal 66 which then causes a signal to be presented upon the "Start Count" terminal 58. At this time there is presented on the "Select Time" terminal 80 of the Mode Program Control 40 suitable signals which serve to reset the timer 78 to its zero time condition and which indicate to the timer the preselected length of time of the next counting period—here, for example, 10 seconds—after which the timer is to transmit a "Stop" signal. The particular circuitry for establishing such signals at the "Select Time" terminal 80 are well known and have not been described herein. Suffice it to say that such circuitry would normally be internal of the Mode Program Control 40.

Under the foregoing conditions and when control signals are simultaneously presented on the terminals 58 and 80, the timer 78 will start to time a 10-second counting interval while the start-stop control 79 will provide control input signals for the gates 81a–81e, thereby enabling the latter to be opened upon the presence of coincident input signals at the photomultipliers PMT # 1, PMT # 2. During the next 10 seconds, the output signals from the summing amplifier 84 are simultaneously presented to the five pulse height analyzing channels in each of which the signal gain is controlled and the pulses are discriminated. When coincident signals are detected, the network 82 provides the second input signal for the gates 81a–81e which serves to open the latter, and those pulses passing through the windows defined by the pulse height analyzers 86a–86e are passed directly to the respective scalers 88a–88e.

Upon completion of the 10-second counting period, the timer 78 (FIG. 4) provides a "Stop" signal for the start-stop control 79 which, in turn, serves to close the gates 81a–81e, thus preventing any further accumulation of counts in the scalers 88a–88e. At this time, the timer 78 provides a signal at the "Count Complete" terminal 59 which is routed through the "ON" contacts of both the Automatic Standardization Control Mode Selector Switch 56 and the "ON" contacts of an Automatic DPM Control Mode Selector Switch 110 (FIG. 3), the latter having been turned to the "ON" state by the technician prior to initiation of the DPM counting cycle. The "Count Complete" signal is thus conveyed directly to the input of a conventional seven-stage ring counter 165, thus driving the first stage thereof from its "1" state to "0" and its second stage from "0" to the "1" state, all other stages thereof being in the "0" state. It will be observed that when the second stage of the counter 165 shifts to its "1" state a signal is passed through the differentiating device 69 to both the "Retract Source" terminal 70 and a terminal P1 (FIGS. 3 and 13), the latter of which signifies for the Computer Program Control 150 that the first count is complete and the computational portion of the system should follow Program No. 1.

Assuming for the sake of discussion that the clock source 162 produces recurring pulses at a frequency of 500 kHz, and that the timing signal generator 164 operates to produce sequenced output signals $t_1, t_2 \ldots t_{500}$ in response to 500 successive input pulses, the successive full cycles of the generator will each transpire in successive 0.001 second intervals. During each such cycle, the timing signals $t_1, t_2, t_3 \ldots$ will occur during successive 2$\mu$sec. intervals, with each signal existing for 1$\mu$sec. and being spaced in time from the next signal for an interval of 1$\mu$sec. These timing rates and intervals are more than sufficient for the Computer Program Control 150 to cause the computer 151 to execute the necessary computations with the numbers represented by input signals on the various sets of input terminals shown at the left in FIG. 13, the result of each computation immediately appearing in the Answer Register and being represented on the trunk conductors AN.

Program No. 1

When an initiating "1" level signal on terminal P1 (FIG. 3) is sent to the same terminal in FIG. 13, the Computer Program Control 150 is conditioned to execute a predetermined sequence of operations, here termed Program No. 1. First, the number represented by signals at S4 (and corresponding to the counts stored in the scaler 88d) is applied to computer input terminal $I_1$, signals representing zero are applied to input terminal $I_2$, and an enabling signal is applied to the "add" or "+" control terminal. This may occur, for example, in response to the timing signal $t_1$ which next appears after the enabling signal appears at terminal P1. The computer adds the number from scaler 88d to zero, and stores the answer (in BCD notation) in the Answer Register 152. After this, and say in response to timing signal $t_2$, the gate 154 is opened to transfer the contents of the Answer Register into storage register 158, so that the number of gross counts held in scaler 88d now are numerically signalled at SRA.

Program No. 1 continues, in response to timing signals $t_3$ and $t_4$, by a similar sequence of steps to transfer the signals from scaler 88e on lines S5 through the computer 151 to the Answer Register 152 and thence into storage register 159, so that the gross counts held in scaler 88e are numerically signalled at SRB. At this point, the gross counts recorded in scalers 88d and 88e (which are primarily produced by the external standard source material 44 during the first 10-second counting period) are respectively stored in the storage registers 158, 159 in binary coded decimal notation, and Program No. 1 is complete.

The apparatus is now ready to commence its second 10-second counting period, this time with the external standard source material 44 retracted. To this end, it will be recalled from the above discussion that upon completion of the first ten-second counting period the ring counter 165 was stepped so as to drive its second stage to the "1" state, thus imposing a control signal at the "Retract Source" terminal 70. That signal is thereafter effective to cause energization of the relay R1, thereby causing the compound external standard source 44 to be retracted in the manner previously described. During such retraction, Program No. 1 as described above is being carried out by the computational system shown in FIG. 13. At the same time, the signal pulse presented at terminal 70 is passed through the time delay device 72 to the "Source Retracted" terminal 71 and thence to the "Start Count" terminal 58, thus signifying to the timer 78 that a second counting cycle should be initiated. It should be noted at this time that the time delay devices 68, 72 which have previously been described are selected such that they not only provide a sufficient delay to insure proper positioning of the compound external standard source 44 before a new count is initiated but, also, the time delay devices provide a sufficient delay to insure that the computational system shown generally in FIG. 13 has performed the various routines demanded of it subsequent to the previous count cycle and which are herein designated as Program Nos. 1, 2 and 3.

At this point, the apparatus 75 depicted in FIG. 4 is ready to repeat a second 10-second counting cycle, the 10-second time interval again having been selected by the Mode Program Control 40 and passed to the timer 78 through the "Select Time" terminal 80. Since simultaneous signals are now present on both terminals 58 and 80, the apparatus now starts through a second 10-second counting period during which the external standard source material 44 is retracted and again disposed within the shielded housing 49 (FIG. 3). Moreover, it should be noted that in response to the preceding "-stop" signal transmitted to the start-stop control 79 from the timer 78, the start-stop control, after a suitable time delay, provides a reset signal over line 91 which is effective to restore all of the scalers 88a–88e to their "zero" count state. The second 10-second counting cycle now proceeds and counts are again accumulated in the scalers 88a–88e, although in this instance the compound source material 44 does not contribute significantly to the accumulated counts.

Program No. 2

Upon completion of the 10-second counting interval, the timer 78 again times out and the gates 81a–81e are again closed in precisely the same manner as described above. The accumulated counts in scalers 88d and 88e are again respectively presented as binary coded decimal inputs S4 and S5 respectively to the input of the Multiplex Gating Circuits and Computer Program Control 150. At the same time, a signal is passed from the timer 78 to the "Count Complete" terminal 58, thereby providing an input signal for the ring counter 165 (FIG. 3) which shifts the latter so that its second stage is restored to the "zero" state and its third stage is driven to the "1" state. When this occurs, a control input signal is provided at one terminal of a conventional "AND" gate 219 (FIG. 3) for a reason which will become readily apparent. At the same time, when the third stage of the counter 165 is driven to the "1" state it provides a signal which is differentiated by a device 218 and then transmitted to a terminal P2 (FIGS. 3 and 13), thus serving to command the computational system of FIG. 13 to thereafter follow Program No. 2. The computational portion of the system is now prepared to compute its first net external standard ratio indicative of the quench level of the unknown test sample.

In order to compute the net external standard ratio, the computational portion of the system now steps through its second routine—viz., Program No. 2. To this end, and in response to the timing signal $t_1$ which next appears after the enabling signal appears at terminal P2, the binary coded decimal data stored in storage register 158 numerically representative of gross external standard counts during the first counting period, and the binary coded decimal data numerically represented by S4 during the second counting period are respectively transferred to the input terminals $I_1$ and $I_2$ for the time-shared digital computer 151, together with a control signal indicating that the input $I_2$ should be subtracted from $I_1$. Those skilled in the art will appreciate that the number of time increments required to perform this subtraction operation will vary dependent upon the particular type of computer employed. Assuming, however, that four time increments are required to perform this subtraction step, then at time interval $t_5$ the answer will appear in the Answer Register 152 and be presented at the gates 154–157. At time instant $t_6$, the gate 156 is clocked open and the binary coded decimal information in the Answer Register 152 is transferred into the storage register 160 for storage therein. This quantity now represents the net external standard counts accumulated in the scaler 88d.

At time instant $t_7$, the binary coded decimal data stored in storage register 159 and applied to the input of the Computer Control 150 as quantity SRB, and the binary coded decimal representation S5 of counts accumulated in scaler 88e during the second 10-second counting period, are respectively transferred to the terminals $I_1$ and $I_2$ of the time-shared digital computer 151, together with another command signal indicating that the computer 151 should perform a subtraction operation in which the counts accumulated during the second counting period are subtracted from those accumulated during the first counting period to arrive at net external standardization counts accumulated in scaler 88e during the preceding counting cycle. Assuming that this subtraction operation again requires four timing increments, the answer will appear in the Answer Register at time interval $t_{11}$.

The answer now in the Answer Register 152 representative of net counts in scaler 88e is now transmitted in binary coded decimal form to the "AN" input of the Computer Program Control 150 and, at time interval $t_{12}$ it is transmitted to the input terminal $I_1$ of the computer 151. At that same time interval $t_{12}$, the data stored in storage register 160 representative of net external standard counts in scaler 88e is transmitted from the storage register to the computer input SRC and from thence to the terminal $I_2$ of the time-shared digital computer together with a command signal indicating that the quantity on terminal $I_2$ should be divided into the quantity on terminal $I_1$. Assuming that this divisional operation requires eight time increments, the resulting quotient which is representative of the net external standardization ratio R will appear in the Answer Register 152 at time interval $t_{22}$, where it will again be fed to the "AN" input terminal of the Computer Program Control 150. At time interval $t_{23}$ the Computer Program Control 150 provides a "ratio ready" signal RR at terminal 166.

Consistent with the assumptions previously made, let it again be assumed that the computed ratio calculated during the preceeding counting cycle is 0.850, which quantity appears in the Answer Register 152 in binary coded decimal form. The actual computed value of the net external standard ratio is now used in accordance with the present invention for causing a controlled voltage level or other suitable signal at terminal 240 (FIGS. 11 and 15) so as to simulate a quench condition for the sample 24.

In order that the computed net external standard ratio can serve to control the value of the modulating signal presented at terminal 240 for energizing the servo motor 139, and thus controllably vary the radial distance r between the photosensitive cathodes of the photomultipliers PMT # 1, PMT # 2 and the vertical centerline through the detection changer, the three least significant digits are utilized to select and adjust the voltage level. As best illustrated by reference to FIG. 14, it will be observed that the four digits appearing in the Answer Register have been arbitrarily designated as digits "a" through "d" from the most significant to the least significant number. Thus, in the exemplary instance the "a" digit is zero while the "b", "c" and "d" digits are respectively "8", "5" and "0". Under these conditions, at time instant $t_{23}$ when the "ratio ready" signal appears at terminal 166 (FIGS. 13, 14), such signal is transmitted directly to the set section S of a bistable flip-flop 168 (FIG. 14), thus switching the S section of the flip-flop to the "1" state and providing a control signal which is effective to open the gate 169. When the gate 169 is opened, pulses from a conventional pulse source or clock 170 are transmitted through the gate and appear on the output line 171 thereof. These pulses are transmitted directly to a decade counter 172 which, upon receipt of ten input pulses, provides an output pulse which is conveyed over line 174 to the reset section R of the flip-flop 168 so as to switch the latter to its "reset" state wherein the S section of the flip-flop is again returned to its "0" state and the gate 169 is, therefore, closed. Thus, the decade counter 172 serves to insure that for each "ratio ready" signal presented at the terminal 166, only ten pulses from the pulse source 170 pass through the gate 169.

Each of the ten pulses passing through the gate 169 are simultaneously presented to three normally open gates which have here been designated as the "b", "c" and "d" gates. Considering first the "b" gate, it will be observed that the ten pulses are passed to the input of this normally open gate with the output from the "b" gate being transmitted in two directions over lines 178 and 179. Those pulses transmitted over the line 178 are conveyed to the input of a BCD decade counter 180 which provides input signals to a comparison network 181, the latter serving to compare the state of the counter 180 with the binary coded decimal notation stored in the "b" digit of the Answer Register. Thus, in this case when the eighth input pulse passes through the "b" gate and into the counter 180, the comparison network 181 will detect equality between its two sets of inputs and it will, therefore, provide an output signal effective to close the "b" gate and preclude the passage of any more of the ten pulses therethrough. Consequently, only eight of the 10 pulses are allowed to pass over the line 179. These eight pulses are transmitted to an "OR" gate 182 and, from there, over line 173 through a normally open gate 175 to the input of a binary coded decimal decade counter 184. Since only eight pulses are passed to the counter 184, the output of the counter in binary coded decimal form is representative of the numeral "8". Here such output is transmitted to a conventional BCD-to-decimal decoder 185, thus causing the output terminal b. 8 thereof to be raised in potential.

The operation of the "c" and "d" gates is substantially identical to that described above for the "b" gate. Thus, pulses are passed through the "c" and "d" gates to respective different decade counters 186, 188 for comparison with the binary coded decimal data in the "c" and "d" digits of the Answer Register 152 by means of comparison networks 189, 187 respectively. When either of these comparison networks detects conditions of equality between their respective sets of inputs, control signals are provided for the "c" and "d" gates to close the latter. In this case, since the "c" digit in the Answer Register is "5", equality is detected by the comparison network 189 when the fifth pulse arrives at counter 186. The comparator 189 then transmits a control signal to close the "c" gate, thus preventing any additional pulses from passing over line 190 to the counter 186 or line 191 to an "OR" gate 192. Since the "c" digit is "5", five pulses pass through the "c" gate and the "OR" gate 192, and thence to the input of a BCD decade counter 194. When the counter 194 reaches the "5" state, it transmits a signal to a decoder 195, raising the c. 5 terminal of the latter in potential.

Similarly, since the binary coded decimal notations stored in the "d" digit of the Answer Register is representative of "0", equality is immediately detected by the comparison network 187 and, therefore, the "d" gate remains closed, thus preventing any pulses from passing to either the BCD counter 188 or the BCD counter 196. Consequently, the counter 196 remains at zero and the d. 0 terminal of its decoder 198 is raised in potential.

It will thus be observed that the net external standard ratio (here 0.850) computed at time instant $t_{22}$ and presented in the Answer Register 152 in binary coded decimal notation has, by the circuitry depicted in FIG. 14 and described above, been converted into digital notation and stored in the respective decoders 185, 195, 198.

Turning next to FIG. 15, there has been illustrated an exemplary arbitrary function digital-to-analog converter 199 which is suitable for converting the digital information in the decoders 185, 195 and 198 of FIG. 14 into increments of voltage for presentation at an output terminal 240, the particular potential level being determined by the value of the computed net external standard ratio, here 0.850. As here shown, the exemplary converter 199 includes three voltage programmers generally indicated at 204, 205, and 206, such voltage programmers being connected in parallel and being respectively coupled to the outputs from the decoders 185, 195 and 198 associated with the "b", "c" and "d" digits. As here shown, the voltage programmer 204 includes transistors Q1–Q9; the programmer 205 includes transistors Q10–Q18; and the programmer 206 includes transistors Q19–Q27.

Referring momentarily to FIG. 15a, there has been schematically illustrated a typical wiring circuit for any one of the transistors Q1 through Q27 shown in FIG. 15. Thus, it will be observed that the transistors are each conventional PNP type junctions having a collector connected to a regulated voltage source E and an emitter connected to ground. The base B is normally maintained at ground potential and, hence, the transistors are normally "OFF." However, when the potential level of the base B is raised, this serves to create a forward positive bias which turns the transistors "ON" and establishes a main current path through the collector-emitter circuit.

Keeping the foregoing characteristics of a typical transistor circuit in mind, it will be appreciated from the foregoing that since the b. 8 terminal of the decoder 185 (FIG. 14) has been raised in potential, and since such terminal is connected to the base of transistor Q2 (FIG. 15), the latter transistor will be turned ON, thus completing a current path from the regulated voltage source E through the resistor $R_{b, 8}$, transistor Q2 and resistor $R_L$ to ground, thus creating a voltage drop across the resistor $R_L$ and establishing a potential level at point $x$ which is a function of the value of the resistances $R_L$ and $R_{b, 8}$.

Similarly, the particular states of the decoders 195 and 198 associated with the "c" and "d" digits also serve to select a particular resistance value in the voltage programmers 205, 206 which values together with the value established by programmer 204 (all three programmers being in parallel) determine the potential level at terminal 240. Thus, since the c. 5 terminal of decoder 195 has been raised in potential, transistor Q14 is turned ON, thereby completing a current path from the voltage source E, through the resistor $R_{c, 5}$, the ON transistor Q14, and resistor $R_L$ to ground. The voltage drop across resistor $R_L$ produced by this completed circuit adds to the potential level at point $x$. In the case of voltage programmer 206, since the terminal d. 0 associated with decoder 198 has been raised in potential, the current path includes an infinite resistance, thereby effectively precluding the programmer 206 from contributing to the potential level at terminal 240. The total voltage drop across the load resistor $R_L$, created by the various current paths described above creates a potential level at point $x$ which is then passed to an amplifier here illustrated at 210, the output of which is presented at terminal 240 as the modulating signal for establishing simulated quench through controlled movement of the photomultipliers PMT # 1, PMT # 2 (FIG. 11)

The value of the potential level at terminal 240 should be sufficient to simulate quenching so as to cause the previously calculated net external standard ratio of 0.850 to converge towards 0.400. It should be noted here that those skilled in the art will appreciate that the particular incremental potential change established by the foregoing procedure is a function of the resistance values inserted into the circuit by selectively turning either one transistor in each programmer, or no transistor in one or more of such programmers, ON. Moreover, the most significant contribution is that provided by programmer 204 (the programmer associated with the most significant of the "b", "c" and "d" digits. Therefore, in keeping with the invention, it is contemplated that the technician will alter the resistance values, at least those in the programmer 204, in accordance with the particular fixed ratio to which he elects to converge. This might be done, merely by way of example, by establishing preset resistor boards, printed circuits, or the like, for each different possible fixed external standard ratio, thus enabling the technician to select and install the proper board or boards at the time he selects the ratio to which he will converge.

The overall apparatus is now ready for a second cycle of operation during which a new net external standard ratio will be computed and again compared with the desired fixed external standard ratio to which the apparatus is now conditioned to converge — here, 0.400. In order to permit such continued operation, when the decade counter 172 (FIG. 14) receives its tenth input pulse from the source 170 and passes a control signal over line 174 to the reset section R of the flip-flop 168, it also passes a control signal over lines 215, 216. The signal transmitted via line 215 is impressed upon the reset terminals for the BCD decade counters 180, 186, 188 associated with the "b," "c" and "d" digits, thus serving to reset each of these counters to zero. Of course, prior to the time that these counters are reset to zero, the decoders 185, 195, and 198 will have already been conditioned so as to raise selective ones of their output terminals in potential and thus establish the potential level transmitted through the terminal 240 to the servo motor drive 140. However, it should also be noted that the BCD decade counters 184, 194 and 196 are not reset at this time. The signal transmitted from the decade counter 172 over line 216 is also impressed upon a "cylce complete" terminal CY–C.

In order that the second complete counting cycle may be commenced, and as best illustrated by reference to FIGS. 3 and 4 conjointly, it will be recalled that at the time the timer 78 timed out after the second 10-second count period with the external standard source in the retracted position, there was provided a "count complete" signal which was again impressed upon the "count complete" terminal 59 for the Mode Program Control. It will also be recalled that such signal was transmitted through the "ON" contacts for each of the Automatic Standardization Control Mode Selector Switch 56 and the Automatic DPM Control Mode Selector Switch 110 so as to return the second stage of the counter 165 (FIG. 3) to the "0" state and raise the third stage thereof to the "1" state. Finally, it will be recalled that the change in state of the third stage of the ring counter 165 to the "1" condition also created one of two required input signals for an "AND" gate 219. It will now be observed that the second required input signal for the "AND" gate 219 is derived from the "cycle complete" terminal CY–C (FIGS. 3 and 16) upon completion of the first counting cycle during which a controlled voltage level was established at terminal 240. Thus, when the first counting cycle has been completed, an output signal will be derived from the "AND" gate 219 which is conveyed through differentiating device 62 and impressed upon the "Insert Source" terminal 64. The compound external standard source 44 will again be inserted and a third 10-second counting program initiated. Upon completion of the third counting operation, a "count complete" signal will be again generated by the timer 78 and applied on the terminal 59, which signal will be directed to the input of the ring counter 165 (FIG. 3) so as to return the third stage thereof to the "0" state and to set the fourth stage thereof in the "1" state. This will again create a control signal at terminal P1 (FIGS. 3 and 15) by which the Computer Program Control 150 will be instructed to again follow Program No. 1 during which the gross external standard counts accumulated in the scalers 88d and 88e will be respectively stored in storage registers 158 and 159. It should be kept in mind that storage registers 158 and 159 will, at this time, still contain the information stored therein during the first complete operating cycle. However, these storage registers, together with storage register 160, are of the conventional type which do not require that they be reset but, to the contrary, wherein any input thereto will cause material already stored therein to be erased.

When the fourth stage of the ring counter 165 is driven to the "1" state, the external standard source 44 will again be retracted by virtue of the fact that the signal passed through differentiating device 69 is also presented on the "Retract Source" terminal 70. This will initiate a fourth 10-second counting cycle precisely the same as the second 10-second counting cycle during which counts will again be accumulated in the various scalers with the external standard source in its retracted position within its shielded housing 49. Upon completion of this count, another input signal will be provided to the ring counter 165 from the timer 78 through the "Count Complete" terminal 59, thus restoring the fourth stage of the counter to its "0" state and driving the fifth stage of the counter to the "1" state. When this occurs, a signal is passed through differentiating device 218 to the terminal P2 to signify to the computer program control that Program No. 2 should again be followed. As was the case upon the completion of the second 10-second counting cycle, Program No. 2 will cause the computational portions of the system to again compute a net external standard ratio in precisely the same manner as discussed above. However, in this instance the net ratio will be considerably lower in view of the simulated quenching produced by movement of the photomultipliers PMT # 1, PMT # 2 away from the centerline of the detection chamber.

Again, to be consistent with the assumptions made previously, let it be assumed that the second computed ratio is 0.459. Thus, the "$a$", "$b$," "$c$" and "$d$" digits in the Answer Register 152 (FIG. 14) will be "0," "4," "5" and "9" respectively. When Program No. 2 has been completed and the second net ratio computed, the "ratio ready" signal impressed upon terminal 166 (FIG. 14) will again drive the flip-flop 168 to its set condition, thus opening the gate 169 and permitting ten more pulses to pass therethrough in precisely the same manner as described before. In this instance, however, the "$b$" digit is no longer at an "8" level, but, rather, it has converged to the "4" level which here represents the preselected value for the tenths digit ("$b$") of the computed ratio. In other words, during the first convergence cycle the contribution of the voltage programmer 204 has been sufficient to bring the tenths digit ("$b$") to the selected value and hence, there is no need to change the now existing state of that particular programmer. Consequently, there is provided a second comparison network 176 which receives its input signals from the "$b$" digit in the Answer Register 152 and from a binary coded decimal switch 177 (FIG. 14) similar to that shown in FIG. 6a. The arrangement is such that when the technician makes his initial decision to converge to a fixed ratio of 0.400, he simply sets the switch 177 to "0.4," thus providing one input to the comparator 176. When the computed ratio reaches 0.4 nn, whether on the first convergence as here, or on a later convergence, the comparator 176 will detect equality between its two sets of input signals, thus generating a control signal which is effective to close the normally open gate 175 in line 173. Under these conditions, no pulses are transmitted to the BCD counter 184 from either the "$b$" gate or the counter 194. Consequently, the decoder 185 remains in a state wherein its output terminal $b$, 8 is raised in potential. It should be noted that this occurs despite the fact that the "$b$" gate will not be closed by comparator 181 until after it passes four pulses to the OR gate 182.

Considering the "$d$" digit next, and skipping for the moment the "$c$" digit, it will be noted that in this instance, the value of the digit is "9." Consequently, nine pulses will be permitted to pass through the "$d$" gate and into both the decade counter 188 and the decade counter 196. When the decade counter 188 provides a binary coded decimal output corresponding to the numeral "9", the comparator 187 will again detect equality between its two sets of input signals, thus closing the "$d$" gate. It will also be recalled that during the first cycle of operation the BCD decade counter 196 associated with the "$e$" digit did not receive any input pulses and, therefore, remained in the zero state. Consequently, the nine pulses which are now delivered to the counter 196 will drive the latter to a condition representative of the numeral "9" in binary coded decimal form, thus raising the terminal $d$. 9 of the decoder 198 to a positive level.

Considering now the "$c$" digit, it will first be appreciated that since the "$c$" digit in the Answer Register 152 is equal to the numeral "5" in binary coded decimal notation, five pulses will be transmitted through the "c" gate before the comparison network 189 closes such gate. These pulses will also be transmitted to the "OR" gate 192 and from thence into the BCD decade counter 194 associated with the "c" digit. However, since the counter 194 was not reset at the completion of the first external standardization ratio computation cycle, it is still in the "5" state. Therefore, the first four pulses of the five new pulses will step the counter 194 to the "9" state. The fifth and last pulse will cause the counter 194 to return to its "zero" state, thus raising the potential level for output terminal c. 0 of decoder 195 and producing a "carry" signal which is transmitted to the "OR" gate 182 and, normally, from such gate over line 173 through the normally open gate 175 to counter 184 associated with the "b" digit. In this instance however, the gate 175 has been closed since comparator 176 has detected that the tenths digit ("b") is already at its desired level. Those skilled in the art will appreciate that the "OR" gate 182 is of a conventional type and will include suitable means internally thereof which will insure that all pulses received from either counter 194 or the "b" gate are counted; i.e., that they are received without coincidence. Consequently, the BCD decade counter 184 will normally receive pulses from either or both of the "b" gate and the counter 194 until such time that comparator 176 causes the gate 175 to close.

Referring now to FIG. 15, it will be appreciated that with the decoders 185, 195 and 198 respectively in the "0.8,""0.0" and "0.9" states, the transistors Q2 and Q19 will be turned ON. This time, however, no transistor will be turned ON in the voltage programmer 205 since the terminal c. 0 of the decoder 195 has been raised in potential, thus introducing an infinite resistance into that particular portion of the circuit. Under these conditions, a small additional increment of potential will appear at terminal 240, its value now being determined by the resistances, $R_{b.8}$, $R_{d.9}$ and $R_L$. As a result of this additional increment of potential, the photomultipliers (FIG. 11) will be moved slightly further apart by servo motor 139, thereby creating additional simulated quench which will tend to cause the net external standard ratio to converge even closer to the selected fixed ratio of 0.400. The apparatus is now ready for a third counting cycle.

It will be recalled that upon completion of the fourth ten-second counting cycle, a signal was presented at the "count complete" terminal 59 (FIG. 3) which caused the ring counter 165 to step to a position wherein the fifth stage thereof was at the "1" state. Since this stage is still at the "1" state, one control input signal for an AND gate 220 is provided. Upon completion of the second cycle when the decade counter 172 (FIG. 14) has received its tenth pulse, a second "cycle complete" signal CY–C is generated which provides the second input signal for AND gate 220. By the time that such signal is generated, the second increment of potential will have been transmitted to the servo motor driver 140 (FIG. 11). Therefore, when the AND gate 220 receives control signals from both the "cycle complete" terminal CY–C and the fifth stage of the ring counter 165, another control signal is transmitted through differentiating device 62 to the "Insert Source" terminal 64, and the foregoing cycle of operation is again repeated. Thus, there will be a fifth ten-second count with the compound standard source material 44 adjacent the sample 24 and, upon completion of that count, another signal will be presented at the "Count Complete" terminal 59 which will cause the ring counter 165 to again step, thereby restoring the fifth stage of the counter to its "0" state and driving the sixth stage thereof to its "1" state.

Under these conditions, another control signal will be impressed upon terminal P1 (FIGS. 3 and 13) by which the Computer Program Control 150 will be instructed to again follow Program No. 1 during which gross external standard counts accumulated in the scalers 88d, 88e will be stored in the storage registers 158, 159 respectively. At the same time, a signal will be impressed upon the "Retract Source" terminal 70 to effect retraction of the compound standard source 44 and the sixth 10-second counting interval will be commenced. Upon completion of the sixth 10-second counting interval, another "complete count" signal will be generated and impressed upon the terminal 59, thus causing the ring counter 165 to be stepped to its seventh stage, driving such stage to the "1" state and restoring the sixth stage thereof to the "0" state. Under these conditions, another signal will be presented upon the terminal P2 (FIGS. 3 and 13) to cause the computer to again step through its Program No. 2 routine for the purpose of computing a third automatic external standardization ratio. Assuming that that ratio turns out to be 0.409, a slight additional increment of potential will be generated in precisely the manner described above, thereby moving the photomultipliers even farther apart and establishing a still greater simulated quench condition. It has been found that, as a practical matter, any deviation between the selected fixed ratios (here, 0.400) and the computed ratio following the third voltage adjustment can be ignored since it will not contribute any significant error to subsequent computations.

At the same time, driving of the ring counter 165 to a condition with its seventh stage in the "1" state will create one input signal for an AND gate 221. When the decade counter 172 (FIG. 14) has counted the necessary ten pulses to establish the third incremental change in the current flowing in the coils 105, it will again produce a "cycle complete" signal at the terminal CY–C, which signal will provide the second necessary input for the AND gate 221. At this point, the AND gate 221 will provide an output signal which is conveyed directly to the "Start Count" terminal 58 so as to initiate a seventh counting cycle here termed the "-data" count. Up until this point in the operational cycle, there have been a total of six 10-second counting intervals, during only the first, third and fifth of which was the sample subjected to radiation from the compound external standard source 44, and during the second, fourth and sixth of which the sample was shielded from the source. The purpose of these six 10-second counting periods is to allow repetitive computations of the external standard ratio under successive controlled conditions of simulated quench so as to enable sufficient voltage or potential changes at terminal 240 (FIGS. 11 and 15) whereby quenching can be simulated to cause the computed external standardization ratios indicative of the effective quench level for the particular test sample to converge towards the preselected fixed external standardization ratio for which counting efficiency is known with a high degree of accuracy — here, a ratio of 0.400.

In response to receipt of the third "cycle complete" signal, the seventh or "data" counting cycle will be initiated in the manner set forth above. In this instance, however, the compound external standard source material 44 will remain retracted and the Mode Program Control 40 will select the desired counting period which may, merely by way of example, be one minute. Upon completion of the 1-minute time cycle established by the Mode Program Control 40 and the timer 78 (FIG. 4), the timer will produce a "stop" signal on line 89, which signal will be transmitted directly to the start-stop contact 79 and to the "count complete" terminal 59. Considering, for the moment, FIG. 3, it will be observed that in this instance when the seventh or "data count" has been completed, an input signal will be transmitted to the ring counter 165 which will cause the latter to step so that its first stage is driven to the "1" state and its seventh stage is restored to its "0" state. Since the first stage of the counter 165 is set in the "1" state, a signal will be transmitted to a terminal P3 (FIGS. 3 and 13) for the purpose of instructing the Computer Program Control 150 that from this point on it is to follow Program No. 3 during which time activity levels in units of decay events per minute (dpm) will be computed for each of the two isotopes ($^3$H and $^{14}$C) in the exemplary sample 24. Finally, when the first stage of the ring counter 165 is driven to its "1" state it will provide an output signal which is passed through the differentiating device 74 (FIG. 3) to the "Start Print" terminal 60 (FIGS. 3 and 13), thereby enabling print out device 161 (FIG. 13) so that data in the Answer Register 152 can be printed out on timed demand in accordance with the routine established by Program No. 3.

Before proceeding with a description of the routine established by Program No. 3 as carried out by the computational portion of the system illustrated diagrammatically in FIG. 13, it may be well to emphasize that during the entire seventh or "data" counting cycle during which counts are accumulating in scalers 88a, 88b (FIG. 4) numerically representative of the activity levels of the two isotopes in the test sample (viz., tritium and carbon-14), current will continue to flow in the coils 105 surrounding the photomultipliers. The value of such current will be that determined upon completion of the third current adjustment following the sixth 10-second counting period. Therefore, during the entire "data" counting period (i.e., the seventh count) the test sample will be quenched not only by its true internal quench characteristics which produced the original external standardization ratio of 0.850, but also by the simulated quench created by movement of the photomultipliers. Therefore, the effective quench level of the system will be the composite values of the actual internal quench characteristics of the sample 24 and the amount of simulated quench and, in this case, the effective quench level of the sample will produce a net external standardization ratio which will, in all probability, be closer to the selected fixed ratio of 0.400 than the last computed ratio of 0.409 since it will be understood that the final voltage adjustment will tend to cause the simulated quench level to converge even closer to the selected fixed level.

Program No. 3

Keeping the foregoing in mind, upon completion of the exemplary one-minute counting period determined by the Mode Program Control 40 and the timer 78 (FIG. 4), the "stop" signal transmitted by the timer 78 to the start-stop control 79 is effective to close the gates 81a–81e. Consequently, no further counts are accumulated in the scalers 88a–88e. At this point, the timer 78 also transmits a signal TI to the Computer Program Control 150 which is representative, in binary coded decimal notation, of the length of the time period, in this case, 1 minute. Also at this time the numerical representations for the accumulated counts in scalers 88a and 88b are transmitted to the input terminals S1, S2 respectively of the Computer Program Control 150. Under the routine established by Program No. 3, the binary coded decimal signal S1 is transmitted to the terminal $I_1$ of the computer 151 at the first occurrence of timing signal $t_1$ after presentation of a signal at terminal P3 which enables the computer to follow Program No. 3. At the same time, signal TI, which is numerically representative of the length of time of the "data" count (here, one minute), is simultaneously transmitted to the terminal $I_2$ of the computer. A command signal is then transmitted from the Computer Program Control 150 to the computer 151 signifying that the value of $I_2$ should be divided into the value of $I_1$. This particular divisional operation may, for example, require 10 timing intervals, whereupon at time instant $t_{11}$ there will be produced in the Answer Register 152 an answer in binary coded decimal notation which is here numerically representative of the gross counts per minute for the AB channel including scaler 88a (hereinafter referred to as Channel I). This data is then presented to the input of the Computer Program Control 150 as a binary coded decimal signal AN numerically representative of gross counts per minute. At time interval $t_{12}$ the data present at the input terminal AN to the Computer Program Control 150 is transmitted to the terminal $I_1$ of the computer 151. At that same time increment $t_{12}$, the binary coded decimal input BG1 to the Computer Program Control representative of the "background count" previously measured for Channel I (which background count, it will be recalled, had been dialed into the system by the technician with the finger dial switches BG1 shown in FIG. 5) is transmitted to the input terminal $I_2$ for the computer 151 together with a command instruction indicating that the data at terminal $I_2$ should be subtracted from the data at terminal $I_1$, thus producing in the Answer Register 152 at a later time interval (for example, at time $t_{22}$) an answer in binary coded decimal notation which is numerically representative of the net counts per minute accumulated in Channel I for the two isotopes, tritium ($^3$H) and carbon-14 ($^{14}$C). This data is then stored in storage register 158 by virtue of a clock signal which serves to open gate 154 at time interval $t_{23}$.

Continuing with Program No. 3, at time interval $t_{24}$ the binary coded decimal data represented at input terminal S2 and the binary coded decimal data representative of the time signal TI are respectively transmitted to the input terminals $I_1$, $I_2$ of the computer 151 together with a command signal ordering the computer 151 to divide the value at terminal $I_1$ by the value at terminal $I_2$, thus producing in the Answer Register 152 at a subsequent time interval (say, for example, time $t_{39}$) a value which is numerically representative of the gross counts per minute in the channel including scaler 88b. As above, this channel will hereinafter be referred to for simplicity as Channel II, it being understood that this is the particular channel defined by the CD window of pulse height analyzer 86b. The answer in Answer Register 152 numerically representative of gross counts per minute in Channel II is then transmitted to the AN input for the computer 151. At time interval $t_{40}$, the binary coded decimal data respectively presented at the computer inputs AN and BG2 (such data being numerically representative of gross counts per minute and background counts accumulated in Channel II) are respectively transmitted to the inputs $I_1$, $I_2$ of the computer 151 together with a command signal indicating that the background count at terminal $I_2$ is to be subtracted from the gross counts at terminal $I_1$. Assuming that this subtraction operation requires five time increments, there will be produced in the Answer Register 152 at time increment $T_{45}$ an answer which is numerically representative in binary coded decimal notation of the net counts per minute in Channel II. At time interval $t_{46}$, a clock signal is provided to open gate 155, and the net counts per minute now represented by the data in the Answer Register are transferred through the gate 155 into the storage register 159.

The computational portion of the system is now conditioned to calculate the true activity level for tritium ($^3H$) by solving the following equation:

$$DPM(^3H) = \frac{\text{Net } CPM_{CH.I}}{E_{CH.I}(^3H)} - \frac{NET\ CPM_{CH.II}}{E_{CH.I}(^3H)\left(\frac{E_{CH.II}(^{14}C)}{E_{CH.I}(^{14}C)}\right)} \quad [II]$$

Before proceeding with the operation of the computational system shown in FIG. 13 to solve equation [II], it will be well to here direct attention to FIGS. 6 and 6a in conjunction with the tables of efficiency previously prepared by the technician and set forth at pages 45 and 46 hereof. Thus, it will be recalled that when the technician prepared the quench correlation curve 95 shown by way of example in FIG. 8a, he was also able to record in Table I the various counting efficiency values for the isotope tritium ($^3H$) as counted Channel I. Referring to FIGS. 6 and 6a conjointly, it will be observed that there is illustrated an auxiliary control panel which here contains ten binary coded decimal switches 225 which are arranged in a horizontal row comprising two groups of three switches and one group of four switches. The arrangement is such that the technician may readily dial into the control panel any set of three efficiency values set forth in Tables I and II corresponding to a preselected one of the external standard ratios of 0.0 through 0.9 respectively. Thus, the three left hand switches would (in the exemplary case where the technician has selected a fixed ratio of 0.400) be respectively set to "1", "0" and "2" to signify a counting efficiency for tritium in Channel I of 0.102. In like manner, the three switches in the center group would be set to the values "3," "8" and "8" to represent the counting efficiency for carbon-14 in Channel II of 0.388 corresponding to an external standard ratio of 0.4. Finally, the four right hand switches would be set to the values "4," "7" and "5" to represent the counting efficiency of 0.475 for carbon-14 in Channel I.

The efficiency values which have been dialed into the auxiliary control panel shown in FIG. 6 are, of course, the very accurate efficiency values which are based upon actual measurements of differently quenched samples containing a known amount of radioactivity for the fixed external standardization ratio of 0.4. If the technician were going to converge to any other selected fixed ratio, it would merely be necessary to select the proper efficiency values from his quench correlation curves. Thus, since these actual efficiency values for the fixed external standardization ratios have been previously dialed into the equipment, it is now possible to solve equation [II] above.

Thus, in keeping with this aspect of the invention, and continuing with Program No. 3, it will be observed that at time interval $t_{47}$ the numerical representation for net counts per minute in Channel I can be transferred from the SRA input terminal for the Computer Program Control 150 to the $I_1$ terminal for the computer 151. Also at time interval $t_{47}$, the counting efficiency for tritium in Channel I is transferred from the X input terminal for the Computer Program Control to the $I_2$ input terminal for the computer 151 together with a command signal for the computer to divide the quantity on terminal $I_2$ into the quantity on terminal $I_1$. It will be understood that the efficiency value at the X input terminal is here derived from the dialed in efficiency in the left hand group of switches shown in FIG. 6. Assuming that the foregoing divisional operation requires twenty time increments, then at time interval $t_{67}$ there will be produced in the Answer Register 152 an answer which is representative of the net counts per minute in Channel I divided by the efficiency of tritium in Channel I. At time interval $t_{68}$, the gate 156 (FIG. 13) is clocked open and the foregoing quantity is stored in storage register 160. It will further be observed upon comparison of the data stored in storage register 160 with equation [II] above that the value is here representative of the left hand portion of the equation—viz., net counts per minute in Channel I divided by the efficiency of tritium in Channel I.

For the purpose of computing the denominator of the right hand portion of equation [II], at time interval $t_{69}$ the numerical representations of the efficiency values for tritium in Channel I and for carbon in Channel II (the latter value having been derived from the setting of the middle group of switches shown in FIG. 6) are respectively transferred from the input terminals X and Y for the Computer Program Control 150 to the input terminals $I_1$ and $I_2$ of the computer 151 together with a command signal instructing the computer to multiply these two values together. Assuming that the multiplication operation requires twenty time increments, the answer will appear in Answer Register 152 at time interval $t_{89}$. That answer is then presented at the AN input terminal for the Computer Program Control 150. At time interval $t_{90}$ the binary coded decimal data at the AN input terminal and at the Z input terminal (the Z terminal here being coupled to the right hand group of dial switches shown in FIG. 6) are respectively transferred to the input terminals $I_1$ and $I_2$ of the computer 151 together with a command signal instructing the computer to divide the value on input terminal $I_2$ into the value on input terminal $I_1$, thus producing in the Answer Register 152 at a subsequent time interval (say, for example, time interval $t_{110}$) a numerical value representative in binary coded decimal notation of the denominator for the right hand half of equation [II], which value is again transmitted to the AN input terminal for the Computer Program Control 150.

The apparatus is now prepared to solve for the right hand half of equation [II]. To this end, at time interval $t_{111}$, the binary coded decimal notations appearing at the SRB and the AN input terminals for the Computer Program Control 150 (the former being numerically representative of net counts per minute in Channel II— i.e., the numerator for the right hand half of equation [II], and the latter being numerically representative of the denominator) are transferred to the input terminals $I_1$, $I_2$ respectively, of the computer 151 together with a command instruction for the computer to divide the value on input terminal $I_2$ into the value on input terminal $I_1$, thus providing in the Answer Register 152 at time interval $t_{131}$ a value representative of the right hand portion of equation [II]. This value is then presented at the AN input terminal for the Computer Program Control 150. At time interval $t_{132}$, the binary coded decimal data stored in storage register 160 is transmitted from input terminal SRC for the Computer Program Control 150 to the input terminal $I_1$ for the computer 151. Also, at time interval $t_{132}$ the binary coded decimal input at the AN input terminal for the Computer Program Control 150 is transmitted to the terminal $I_2$ for the computer 151 together with a command instruction for the computer to subtract the value at terminal $I_2$ from the value at terminal $I_1$. Assuming that this subtraction operation requires four time increments, there will be produced in the Answer Register 152 at time interval $t_{136}$ a numerical value in binary coded decimal form which is equal to the true activity level for tritium ($^3H$) in units of decay events per minute. This value is then transmitted directly to the print out device 161 at time interval $t_{137}$ by virtue of a clock signal which serves to open the gate 157. Since the print out device 161 has previously been enabled by means of the "Start Print" signal appearing at terminal 60 (FIGS. 3 and 13) it will decode the data and print out in any suitable form the data representative of the true activity level of tritium in decay events per minute. Let it be assumed for purposes of this discussion that fifty timing steps are required to print out this data. Under this assumption, print out of the activity level for tritium will be completed at time interval $t_{187}$.

The computational system is now in condition to compute the true activity levels for the higher energy isotope carbon-14 ($^{14}C$) in units of decay events per minute in accordance with the following equation:

$$DPM(^{14}C) = \frac{\text{NET } CPM_{CH.II}}{E_{CH.II}(^{14}C)} \quad [III]$$

To this end, at time interval $t_{188}$ the value stored in storage register 159 (here numerically representative of net counts per minute in Channel II) is transferred from the SRB input terminal for the Computer Program Control 150 to the $I_1$ input terminal for the computer 151. Also at time interval $t_{188}$, the efficiency value for carbon in Channel II is transferred from the Y input terminal for the Computer Program Control 150 to the $I_2$ input terminal for the computer 151 together with a command signal instructing the computer to divide the quantity at terminal $I_2$ into the quantity at terminal $I_1$. Assuming that such divisional operation requires twenty time increments, there will be produced at time interval $t_{208}$ an answer in the Answer Register 152 which is numerically representative of the true activity level for carbon-14 in decay events per minute, such value being in binary coded decimal notation. At time interval $t_{209}$, the gate 157 is again clocked open and the binary coded decimal information in the Answer Register 152 numerically representative of carbon-14 activity level in decay events per minute is transferred to the print out device 161. Since the latter is still enabled because of the "Start Print" signal presented at terminal 60 (FIGS. 3 and 13), it will immediately print out in any suitable manner the true activity level of carbon-14 in decay events per minute. Assuming that the printing operation requires fifty timing steps, it will be appreciated that at time interval $t_{259}$ print out will be completed for both carbon-14 ($^{14}C$) and tritium ($^3H$) activity levels. At this point the print out device 161 transmits an "End Print" signal EP to the "End Print" terminal 61 of the Mode Program Control 40 (FIG. 3), which signal is then transferred to the "Change Sample" terminal 41 for the purpose of energizing the elevator motor M1 through its UNLOAD terminal (see FIG. 4), and thus ejecting the sample. At the same time, and as best illustrated in FIG. 14, the "End Print" signal EP from the print out device 161 is also conveyed to the reset terminals for the BCD decade counters 184, 194, 196, thus effectively returning all of these counters to their "zero" state in readiness for a counting cycle for the next successive sample. Since these three counters are returned to their "zero" states, it will be appreciated that their respective decoders 185, 195 and 198 will have their b.0, c.0 and d.0 terminals raised to a positive potential. Under these conditions, infinite resistance values will be inserted into the voltage programmers 204, 205, 206 and the potential level at point x (FIG. 15) will now be determined by the current path through resistors $R_{b.0}$, the now ON transistor Q11 in voltage programmer 200, resistance $R_1$, resistance $R_c$, the now ON transistor Q49, and resistance $R_L$.

The operating cycle for the system is now complete and the apparatus is in condition to compute true activity levels for the next sample introduced into the detection chamber.

A slightly modified elevator and detector assembly 120', also embodying the features of the present invention, has been illustrated by way of example in FIG. 12. In this form of the invention, advantage is taken of the fact that it has been found that the quantum of light reaching the photosensitive cathodes of the photomultipliers can be selectively decreased or increased by interposing conventional variable iris lenses between the sample 24 and the cathodes of the photomultipliers PMT # 1, PMT # 2, and thereafter adjusting the size of the opening through such lenses as a function of the signal level presented on terminal 240 (FIGS. 12 and 15). To accomplish this, the terminal 240 here presents its control signal input to a conventional servo motor driver 140' which, in turn, provides regulated inputs to a reversible servo motor 139' so as to drive the output shaft 138' of the latter through controlled increments of rotation. As here shown, the components 138', 139' and 140' may be identical to the corresponding components 138, 139 and 140 previously described in connection with FIG. 11. In this instance, however, the servo motor drive shaft 138' has keyed thereon, or otherwise affixed thereto, a pair of spaced bevel gears 142, 143, the latter being respectively meshed with bevel gears 144, 145. In this instance, the bevel gears 144, 145 are respectively coupled to actuating shafts 146, 147, the latter being respectively coupled to a pair of conventional variable aperture iris type lenses 148, 149. The arrangement is such that upon rotation of the servo motor drive shaft 138', the actuating shafts 146, 147 respectively associated with the lenses 148, 149 are rotationally driven so as to controllably vary the size of the apertures in the lenses, and thus varying the amount of light permitted to reach the photomultipliers so as to produce a simulated quench condition.

Those skilled in the art will appreciate that the variable aperture iris type lenses 148, 149 could readily be replaced with conventional sets of polarized lenses (not shown) for example, sets of the type having a stationary lens and a second lens movable with respect to the stationary lens. In this instance, the actuating shafts 146, 147 (FIG. 12) could be utilized to effect rotation of the movable lens so as to affect the quantum of light reaching the photomultipliers PMT # 1, PMT # 2, thereby reducing counting statistics and creating a simulated quench condition.

While the present invention has hereinabove been described in conjunction with various procedures and equipment for simulating quench conditions for test samples having unknown quench characteristics by means of repetitive computations of net external standard ratio, those skilled in the art will appreciate that other variable quench correlation parameters could be employed. Thus, for example, referring to FIG. 11, there has been illustrated a typical quench correlation curve 250 for a tritium isotope in which the variable quench correlation parameter to be measured is net external standard counts. That is, in this instance the abscissa of the curve is scaled in units of net external standard counts in any selected window—for example, the G-to-infinity window which transmits counts to scaler 88d (FIG. 4), while the ordinate is scaled in tritium efficiency wherein the tritium window (i.e., the AB window) in Channel I is a relatively wide window. By "net external standard counts" it is, of course, meant that the count accumulated in scaler 88d when no external standard source is present is to be subtracted from the count accumulated in such scaler when an external standard source is present. In other words, the net external standard count can be computed in accordance with Program Nos. 1-3 hereinabove described. In this instance, the curve 250 would be prepared in advance based upon preselected fixed net external standard counts and the circuitry shown by way of example in FIGS. 14 and 15 would be effective to simulate quenching until the net external standard count computed converged to one of such preselected points where counting efficiency is known precisely.

Yet another form of quench correlation parameter has been illustrated by way of example in FIG. 12. In this case, there is graphically represented a quench correlation curve 251 based upon normalized channels ratio. Those interested in learning specific details about a normalization system for permitting determination of normalized channels ratio are referred to the aforesaid copending Bristol application. Thus, in this particular type of system the technician would set his channels so as to compute channels ratio for the particular isotope being analyzed. In other words, assuming that the isotope is tritium, the windows for Channel I and Channel III might be adjusted so that the tritium spectrum produced counts in both scalers 88a and 88c (FIG. 4). Thus, the ratio of counts in these two channels (or for that matter, any two channels) would provide a variable measurable parameter indicative of the degree of quenching. Such parameter could again be arbitrarily set to 1.000 for an unquenched sample. Use of the curve 251 would be the same as the curve 250 described above. In other words, the technician would again create the curve 251 by selecting certain fixed points to which he desired to converge.

It will be appreciated from the foregoing that there has been disclosed herein a novel system for enabling simulated quench conditions to be imposed upon the true quench characteristics of any given sample so as to create for the sample an effective quench level for which counting efficiencies are accurately known.

While the present invention has herein been described in connection with quench correlation curves defined by eleven (11) preselected fixed ratio points, those skilled in the art will appreciate that the particular selection of fixed points is completely arbitrary. Thus, the technician can select any desired number $n$ of fixed points to converge to where such number $n$ may be two or more and will meet his particular requirements. Moreover, the particular selected fixed ratio points need not be spaced by multiples of tenths, nor do they need to be even numbers. Merely by way of example, it is entirely within the scope of the invention to arbitrarily select three fixed ratio points of 0.567, 0.782 and 0.789. Therefore, it will be understood that references to a plurality of fixed points in the claims appended hereto shall not be limited to the exemplary forms of the invention described herein.

Also, it will be apparent from the disclosure herein that the present invention will find equal application with dual labeled samples, single labeled samples, intermixed samples, or samples that are multiply labeled with more than two isotopes.

It will also be understood that the present invention will find equally advantageous application with any desired number of significant digits rather than simply the illustrative four digits herein referred to. Thus, it could be used with systems having fewer or more digits. Moreover, it is entirely possible to arrange the system so that other than three voltage adjustment cycles are provided. Indeed, even if the system includes provision for normally following three adjustment cycles as disclosed herein, it would be entirely possible to automatically eliminate the second and/or third adjustment cycle if the first and/or second voltage adjustment caused the computed ratio to converge to within an acceptable tolerance range. For example, with the exemplary system shown herein, there might be provided a comparison network (not shown) associated with either or both of the "*c*" and "*d*" digits in the Answer Register, the comparison network or networks being arranged so that when they reached a preselected point they would transmit a control signal to the Mode Program Control 40 (FIG. 3) which was effective to terminate further ten-second counting cycles and to immediately initiate a "data" count.

Finally, it will be understood that the various modified forms of the invention herein illustrated and described are all directed to methods and equipment for simulating quenching for any given sample, irrespective of its true internal quench characteristics, by establishing a controllably variable simulated quench modulating signal, the value of which is a function of a measured quench correlation parameter for the sample, and then employing such signal to affect counting statistics by reducing the amount of light transmitted to the light transducers. Consequently, it is within the scope of the present invention that such signal can be utilized in other equivalent ways to produce the same result. For example, the signal transmitted to terminal 240 (FIG. 15) might also be employed to energize a suitable heater or the like (not shown) which might be disposed in the elevator platform, thereby creating incremental changes in the temperature of the sample being counted so as to simulate quenching by changing the efficiency of the scintillator, or by altering through changes in temperature the quench characteristics of other sample constituents.

I claim as my invention:

1. Apparatus for simulating quenching in test samples containing one or more radioactive isotopes disposed in a liquid scintillator comprising a light transducer, means for positioning a sample adjacent said transducer in light transmissive relationship therewith so as to establish a sample-transducer combination which permits counting of light scintillations occurring in the sample, and means for controllably altering the counting statistics of said sample-transducer combination so as to simulate quenching in said sample.

2. Apparatus as set forth in claim 1 further characterized in that said means for altering counting statistics comprises means for reducing the light input to said transducer.

3. Apparatus as set forth in claim 2 further characterized in that said light input reduction means comprises means for moving said transducer away from said sample in controlled increments.

4. Apparatus as set forth in claim 2 further characterized in that said light input reduction means comprises a mechanical shutter interposed between said transducer and said sample, and means for controllably adjusting said shutter to vary said light input.

5. Apparatus as set forth in claim 4 further characterized in that said mechanical shutter comprises a variable iris lens.

6. Apparatus as set forth in claim 2 further characterized in that said light input reduction means comprises a polarizing lens.

7. Apparatus as set forth in claim 2 further characterized in that said light reduction means comprises means for altering the efficiency of the liquid scintillator.

8. Apparatus for simulating quench conditions for a sample containing at least one radioactive isotope disposed in a liquid scintillation medium comprising, in combination, means for measuring a selected quench correlation parameter for the sample, means for establishing a variable simulated quench modulating signal having a value which is a function of the measured quench correlation parameter, and means for controlling the variable simulated quench modulating signal so as to affect counting statistics to cause a measured selected quench correlation parameter for the sample to shift towards a fixed preselected point.

9. Apparatus for simulating quench conditions for a group of successive samples having diverse internal true quench levels and each containing at least one radioactive isotope disposed in a liquid scintillation medium comprising, in combination, means for establishing a fixed preselected quench correlation parameter for which counting efficiency is accurately known and which is below the true measurable quench correlation parameter for the most quenched sample in said group, means for measuring the quench correlation parameter for each sample, means for establishing a variable simulated quench modulating signal having a value which is a function of the measured quench correlation parameter for each sample, and means for controlling the variable simulated quench modulating signal so as to affect counting statistics to cause the measured quench correlation parameter for all of said samples to converge to the fixed preselected quench correlation parameter for the most quench sample in said group.

10. Apparatus as set forth in claim 9 further characterized in that said quench correlation parameter is net external standard ratio.

11. Apparatus as set forth in claim 9 further characterized in that said quench correlation parameter is net external standard count.

12. Apparatus as set forth in claim 9 further characterized in that said quench correlation parameter is channels ratio.

13. A data processing system for determining activity levels of test samples containing one or more radioactive isotopes in units of decay events per unit time and wherein counting efficiency for the system is known only at *n* discrete fixed points for any given isotope and wherein a measurable quench correlation parameter R for the sample is known at each of said points, said system comprising, in combination, first means for storing a numerical representation of counting efficiency for a known value of the parameter R corresponding to one of the *n* discrete points, second means for measuring the parameter R for each sample, third means for comparing the measured parameter R for the sample with the known value of parameter R, fourth means for simulating quenching for each sample, fifth means for controllably varying said fourth means to cause the measured parameter R to converge upon the known value of the parameter R, sixth means for counting light scintillations per unit time created in the sample by isotope decay events therein and for producing a numerical representation of counts per unit time, and seventh means for dividing the stored numerical representation of counting efficiency into the numerical representation of counts per unit time which are produced after said measured parameter R has converged upon the known value of the parameter R.

14. A data processing system as set forth in claim 13 further characterized in that said parameter R is external standard ratio.

15. A data processing system as set forth in claim 13 further characterized in that said fourth means comprises means for reducing the light input to said sixth means.

16. The method of simulating quenching for a sample containing at least one radioactive isotope disposed in a liquid scintillation medium comprising the steps of
   a. measuring a selected quench correlation parameter for the sample,
   b. establishing a controlled variable simulated quench modulating signal having a a value which is a function of the measured quench correlation parameter, and
   c. employing the controlled variable simulated quench modulating signal to affect counting statistics.

17. The method of simulating quenching for a plurality of samples, each containing at least one radioactive isotope disposed in a liquid scintillation medium, comprising the steps of
   a. measuring a selected quench correlation parameter for each of the samples,
   b. establishing a controlled variable simulated quench modulating signal having a value which is a function of the measured quench correlation parameter for each of the samples, and
   c. employing the controlled variable simulated quench modulating signal to reduce light inputs to the light transducers employed for measuring the correlation parameters by an amount sufficient to simulate quenching for all samples irrespective of their true internal quench level whereby the effective quench levels for all samples are the same and are somewhat below that of the most quench sample in any given group of samples.

18. The method of compensating for errors in computations of counting efficiency for $n$ test samples containing one or more radioactive isotopes disposed in a liquid scintillator comprising the steps of
   a. establishing a fixed quench correlation parameter for which counting efficiency is accurately known and which is at least as low as the actual quench correlation parameter for the most quenched sample expected to be encountered,
   b. affecting counting statistics for each of said samples by creating a condition in which each sample can be counted as if it were quenched to a greater degree than it actually is,
   c. adjusting the created condition so that the measured quench correlation parameters for all of the samples converge to the fixed quench correlation parameter irrespective of the actual quench levels of any given one of the samples, and
   d. counting light scintillations created in each of the samples by interactions between radiations emanating from the isotopes therein and the liquid scintillating medium while the samples are subjected to the adjusted created condition.

19. The method as set forth in claim 18 further characterized in that the quench correlation parameter is net external standard ratio.

20. The method as set forth in claim 18 further characterized in that the quench correlation parameter is net external standard count.

21. The method as set forth in claim 18 further characterized in that the quench correlation parameter is channels ratio.

22. The method as set forth in claim 18 further characterized in that counting statistics are affected by reducing the light input to the light transducers employed for counting light scintillations.

23. The method as set forth in claim 22 further characterized in that the light input to the transducers is reduced by incrementally moving the transducers away from each of the samples.

24. The method as set forth in claim 22 further characterized in that the light input to the transducers is reduced by interrupting the passage of light photons from the scintillations to the transducers.

25. The method of simulating quench conditions in a test sample containing one or more radioactive isotopes in a liquid scintillation medium comprising the steps of
   a. establishing a fixed quench correlation parameter for which counting efficiency is accurately known,
   b. positioning the sample adjacent the light sensitive face of a light transducer,
   c. counting light scintillations produced in the sample and determining the quench correlation parameter indicative of the actual quench level in the sample, and
   d. modulating the counting statistics of the sample/light transducer combination so as to simulate a quench condition for the sample whereby the composite effect of the actual quench level for the sample and the simulated quench level is an effective quench level which produces a measurable quench correlation parameter corresponding to the fixed quench correlation parameter.

26. The method as set forth in claim 25 further characterized in that the counting statistics are modulated by reducing the light inputs to the sample/light transducer combination.

27. The method of computing true activity levels for test samples by simulating quench conditions in each test sample and wherein each sample containing a radioactive isotope in a liquid scintillation medium, comprising the steps of
   a. establishing a fixed quench correlation parameter for which counting efficiency for the isotope is accurately known,
   b. positioning each sample adjacent the light sensitive face of a photomultiplier,
   c. counting light scintillations produced in each sample and determining the quench correlation parameter indicative of the actual quench level in each sample,
   d. modulating the counting statistics of the sample/photomultiplier combination so as to simulate a quench condition for each sample whereby the composite effect of the actual quench level for each sample and the simulated quench level is an effective quench level which produces a measurable quench correlation parameter corresponding to the fixed quench correlation parameter, e. counting light scintillations produced in each sample by the isotope contained therein while the counting statistics are modulated to determine net counts per unit time, and f. dividing the determined net counts per unit time by the counting efficiency associated with the fixed quench correlation parameter.

28. The method as set forth in claim 27 further characterized in that all of the samples irrespective of their actual quench level have superimposed thereon a simulated quench level sufficient to reduce their effective quench level to a point corresponding to the most quenched sample encountered in any given group.

29. The method as set forth in claim 27 further characterized in that counting statistics are modulated by reducing the light input to the sample/photomultiplier combination.

* * * * *